(12) United States Patent  
Nakayama

(10) Patent No.: US 8,311,404 B2
(45) Date of Patent: Nov. 13, 2012

(54) IMAGE BLUR CORRECTION APPARATUS AND IMAGING APPARATUS

(75) Inventor: Tatsuyuki Nakayama, Kanagawa (JP)

(73) Assignee: Sony Corporation, Tokyo (JP)

( * ) Notice: Subject to any disclaimer, the term of this patent is extended or adjusted under 35 U.S.C. 154(b) by 21 days.

(21) Appl. No.: 13/090,570

(22) Filed: Apr. 20, 2011

(65) Prior Publication Data

US 2011/0317987 A1 Dec. 29, 2011

(30) Foreign Application Priority Data

Jun. 24, 2010 (JP) ................................. 2010-143693

(51) Int. Cl.
*G03B 17/00* (2006.01)
(52) U.S. Cl. ...................................... 396/55; 348/208.7
(58) Field of Classification Search .............. 396/52–55; 348/208.7, 208.11; 359/554, 557
See application file for complete search history.

(56) References Cited

U.S. PATENT DOCUMENTS

| 5,305,040 | A | | 4/1994 | Enomoto | |
|---|---|---|---|---|---|
| 6,389,228 | B1 | * | 5/2002 | Uenaka | 396/55 |
| 6,606,457 | B2 | * | 8/2003 | Enomoto | 396/55 |
| 7,561,785 | B2 | * | 7/2009 | Hirunuma et al. | 396/55 |
| 7,983,545 | B2 | * | 7/2011 | Maeda et al. | 396/55 |
| 2001/0007612 | A1 | * | 7/2001 | Wada et al. | 396/55 |
| 2009/0225177 | A1 | | 9/2009 | Maeda et al. | |

FOREIGN PATENT DOCUMENTS

| JP | 6-35022 | 2/1994 |
|---|---|---|
| JP | 8-194241 | 7/1996 |
| JP | 2009-42369 | 2/2009 |

* cited by examiner

*Primary Examiner* — Christopher Mahoney
(74) *Attorney, Agent, or Firm* — Oblon, Spivak, McClelland, Maier & Neustadt, L.L.P.

(57) ABSTRACT

An image blur correction apparatus includes: a fixed member; a first driven unit pivotally supported by the fixed member around a first support shaft extending in a direction parallel to an optical axis direction; a second driven unit holding a lens or an imaging device and pivotally supported by the first driven unit around a second support shaft extending in the direction parallel to the optical axis direction; a first actuator that produces a thrust force for pivoting the first and second driven units around the first support shaft; and a second actuator that produces a thrust force for pivoting the second driven unit around the second support shaft, wherein the first and second actuators are configured to produce the thrust forces in the same direction.

7 Claims, 19 Drawing Sheets

IMAGE BLUR CORRECTION APPARATUS AND IMAGING APPARATUS

BACKGROUND OF THE INVENTION

1. Field of the Invention

The present invention relates to a technical field of an image blur correction apparatus and an imaging apparatus, and particularly to a technical field in which the mechanism of the apparatus is simplified and the size of the apparatus is reduced by configuring first and second actuators to produce thrust forces in the same direction.

2. Description of the Related Art

Some video camcorders, still cameras, and other imaging apparatus include an image blur correction apparatus that corrects image blur by moving a lens or an imaging device in the direction perpendicular to the optical axis direction.

Some image blur correction apparatus of this type include a first driven unit pivotally supported by a fixed member around a first support shaft and a second driven unit pivotally supported by the first driven unit around a second support shaft, and the first and second support shafts are so disposed that they extend in the direction parallel to the optical axis direction (see JP-A-6-35022, for example).

In the image blur correction apparatus described in JP-A-6-35022, in which the second driven unit holds a lens or an imaging device, when the first driven unit is pivoted around the first support shaft relative to the fixed member in a first direction perpendicular to the optical axis direction, the second driven unit supported by the first driven unit is driven in response to the pivotal motion of the first driven unit and the lens or the imaging device is moved in the first direction. Further, when the second driven unit is pivoted around the second support shaft relative to the first driven unit in a second direction perpendicular to the optical axis direction and the first direction, the lens or the imaging device is moved in the second direction.

The image blur correction apparatus further includes a first actuator that pivots the first and second driven units in the first direction and a second actuator that pivots the second driven unit in the second direction. The first actuator produces a thrust force in the first direction, and the second actuator produces a thrust force in the second direction.

SUMMARY OF THE INVENTION

In the image blur correction apparatus described in JP-A-6-35022, however, the direction of the thrust force which the first actuator produces is perpendicular to the direction of the thrust force which the second actuator produces. As a result, the first and second actuators are disposed so that they are perpendicular to each other. That is, the first and second actuators need to be disposed in different directions, and the mechanism of the apparatus is complicated accordingly. At the same time, the space for accommodating the first and second actuators increases, resulting in a difficulty in size reduction.

Thus, it is desirable to provide an image blur correction apparatus and an imaging apparatus that can solve the problem described above and achieve simplification of the mechanism of the apparatus and reduction in the size of the apparatus.

According to an embodiment of the invention, there is provided an image blur correction apparatus including a fixed member, a first driven unit pivotally supported by the fixed member around a first support shaft extending in a direction parallel to an optical axis direction, a second driven unit holding a lens or an imaging device and pivotally supported by the first driven unit around a second support shaft extending in the direction parallel to the optical axis direction, a first actuator that produces a thrust force for pivoting the first and second driven units around the first support shaft, and a second actuator that produces a thrust force for pivoting the second driven unit around the second support shaft. The first and second actuators are configured to produce the thrust forces in the same direction.

In the image blur correction apparatus, the first and second actuators, which are configured to produce the thrust forces in the same direction, pivot the first and second driven units, respectively.

In the image blur correction apparatus described above, when a first line is defined as a line extending in a direction determined by connecting the center of the first support shaft to the center of the second support shaft, and a second line is defined as a line extending in a direction determined by connecting the center of the second support shaft to the center of the lens or the imaging device, the first line and the second line are desirably perpendicular to each other.

When the first line and the second line are perpendicular to each other, the pivotal motion of the first driven unit little affects correction made by the operation of the second driven unit.

In the image blur correction apparatus described above, it is desirable that the first actuator is formed of a first drive magnet and a first drive coil that faces the first drive magnet; the second actuator is formed of a second drive magnet and a second drive coil that faces the second drive magnet; and the first and second drive magnets are formed of a common drive magnet.

When the first and second drive magnets are formed of a common drive magnet, the first and second driven units are pivoted by the magnetic flux produced by the common drive magnet.

The image blur correction apparatus described above desirably further includes a first detection device that detects the position of the first driven unit in the direction of the pivotal motion thereof, a second detection device that detects the position of the second driven unit in the direction of the pivotal motion thereof, a first detection magnet that allows the first detection device to perform the detection, and a second detection magnet that allows the second detection device to perform the detection, and the first and second detection magnets are desirably formed of a common detection magnet.

When the first and second detection magnets are formed of a common detection magnet, the positions of the first and second driven units are detected by the change in magnetic flux produced by the common detection magnet.

The image blur correction apparatus described above desirably further includes a first detection device that detects the position of the first driven unit in the direction of the pivotal motion thereof, a second detection device that detects the position of the second driven unit in the direction of the pivotal motion thereof, a first detection magnet that allows the first detection device to perform the detection, and a second detection magnet that allows the second detection device to perform the detection, and it is desirable that the first and second detection magnets are formed of a common detection magnet, and that the drive magnets and the detection magnets are formed of a common magnet.

When the drive magnets and the detection magnets are formed of a common magnet, the first and second driven units are pivoted by the magnetic flux produced by the common magnet and the positions of the first and second driven units are detected by the change in the magnetic flux produced by the common magnet.

The image blur correction apparatus described above desirably further includes first and second guide shafts disposed in a plane perpendicular to the optical axis direction, and it is desirable that the first driven unit is supported by the first and second guide shafts, and that the second driven unit is supported by the first and second guide shafts.

When the first driven unit is supported by the first and second guide shafts, and the second driven unit is supported by the first and second guide shafts, the first and second guide shafts are shared by the first driven unit and the second driven unit.

According to another embodiment of the invention, there is provided an imaging apparatus including an image blur correction apparatus that corrects image blur by moving a lens or an imaging device in a direction perpendicular to an optical axis direction, the image blur correction apparatus including a fixed member, a first driven unit pivotally supported by the fixed member around a first support shaft extending in a direction parallel to the optical axis direction, a second driven unit holding the lens or the imaging device and pivotally supported by the first driven unit around a second support shaft extending in the direction parallel to the optical axis direction, a first actuator that produces a thrust force for pivoting the first and second driven units around the first support shaft, and a second actuator that produces a thrust force for pivoting the second driven unit around the second support shaft. The first and second actuators are configured to produce the thrust forces in the same direction.

In the imaging apparatus, the first and second actuators, which are configured to produce the thrust forces in the same direction, pivot the first and second driven units, respectively.

The image blur correction apparatus according to the embodiment of the invention includes a fixed member, a first driven unit pivotally supported by the fixed member around a first support shaft extending in a direction parallel to an optical axis direction, a second driven unit holding a lens or an imaging device and pivotally supported by the first driven unit around a second support shaft extending in the direction parallel to the optical axis direction, a first actuator that produces a thrust force for pivoting the first and second driven units around the first support shaft, and a second actuator that produces a thrust force for pivoting the second driven unit around the second support shaft. The first and second actuators are configured to produce the thrust forces in the same direction.

As a result, the first and second actuators can be disposed in the same direction, whereby the mechanism can be simplified, and the space for disposing the first and second actuators and hence the size of the apparatus can be reduced.

The image blur correction apparatus described above may be configured such that, when a first line is defined as a line extending in a direction determined by connecting the center of the first support shaft to the center of the second support shaft, and a second line is defined as a line extending in a direction determined by connecting the center of the second support shaft to the center of the lens or the imaging device, the first line and the second line are perpendicular to each other.

As a result, the pivotal motion of the first driven unit little affects correction made by the operation of the second driven unit, whereby the performance in blur correction can be improved.

The image blur correction apparatus described above may be configured such that the first actuator is formed of a first drive magnet and a first drive coil that faces the first drive magnet, the second actuator is formed of a second drive magnet and a second drive coil that faces the second drive magnet, and the first and second drive magnets are formed of a common drive magnet.

As a result, the number of parts and hence the manufacturing cost can be reduced.

The image blur correction apparatus described above may further includes a first detection device that detects the position of the first driven unit in the direction of the pivotal motion thereof, a second detection device that detects the position of the second driven unit in the direction of the pivotal motion thereof, a first detection magnet that allows the first detection device to perform the detection, and a second detection magnet that allows the second detection device to perform the detection, and the first and second detection magnets are formed of a common detection magnet.

As a result, the number of parts and hence the manufacturing cost can be reduced.

The image blur correction apparatus described above may further include a first detection device that detects the position of the first driven unit in the direction of the pivotal motion thereof, a second detection device that detects the position of the second driven unit in the direction of the pivotal motion thereof, a first detection magnet that allows the first detection device to perform the detection, and a second detection magnet that allows the second detection device to perform the detection. The first and second detection magnets may be formed of a common detection magnet, and the drive magnets and the detection magnets may be formed of a common magnet.

As a result, the number of parts and hence the manufacturing cost can be further reduced.

The image blur correction apparatus described above may further include first and second guide shafts disposed in a plane perpendicular to the optical axis direction. The first driven unit may be supported by the first and second guide shafts, and the second driven unit may be supported by the first and second guide shafts.

As a result, the first and second guide shafts support not only the first driven unit but also the second driven unit, whereby the number of parts can be reduced, and the mechanism can be simplified.

The imaging apparatus according to the embodiment of the invention includes an image blur correction apparatus that corrects image blur by moving a lens or an imaging device in a direction perpendicular to an optical axis direction, the image blur correction apparatus including a fixed member, a first driven unit pivotally supported by the fixed member around a first support shaft extending in a direction parallel to the optical axis direction, a second driven unit holding the lens or the imaging device and pivotally supported by the first driven unit around a second support shaft extending in the direction parallel to the optical axis direction, a first actuator that produces a thrust force for pivoting the first and second driven units around the first support shaft, and a second actuator that produces a thrust force for pivoting the second driven unit around the second support shaft. The first and second actuators are configured to produce thrust forces in the same direction.

As a result, the first and second actuators can be disposed in the same direction, whereby the mechanism can be simplified, and the space for disposing the first and second actuators and hence the size of the apparatus can be reduced.

DESCRIPTION OF THE PREFERRED EMBODIMENTS

Figure 1:
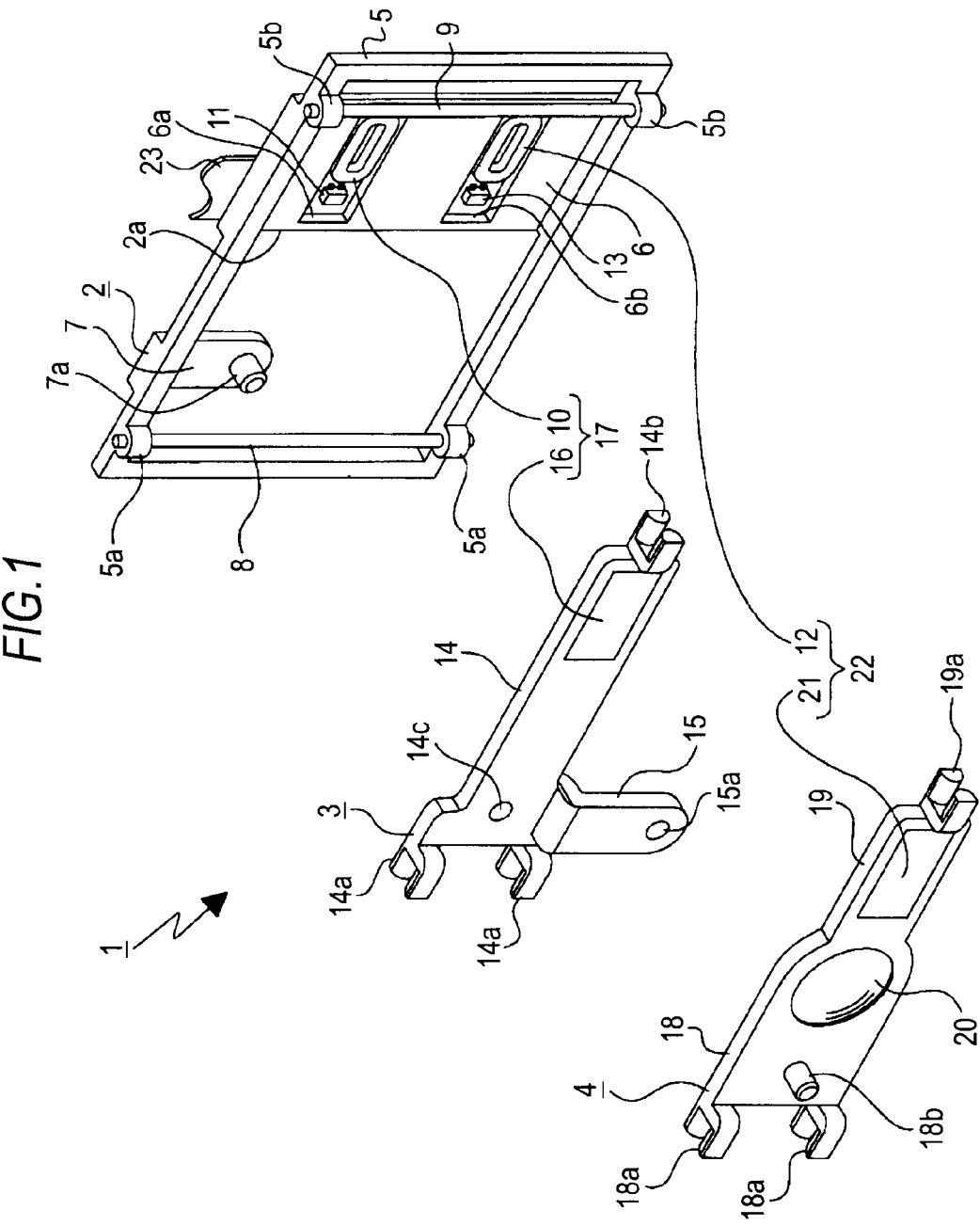
FIG. 1, along with FIGS. 2 to 9, shows an image blur correction apparatus according to a first embodiment of the invention and is an exploded perspective view.
Figure 2:
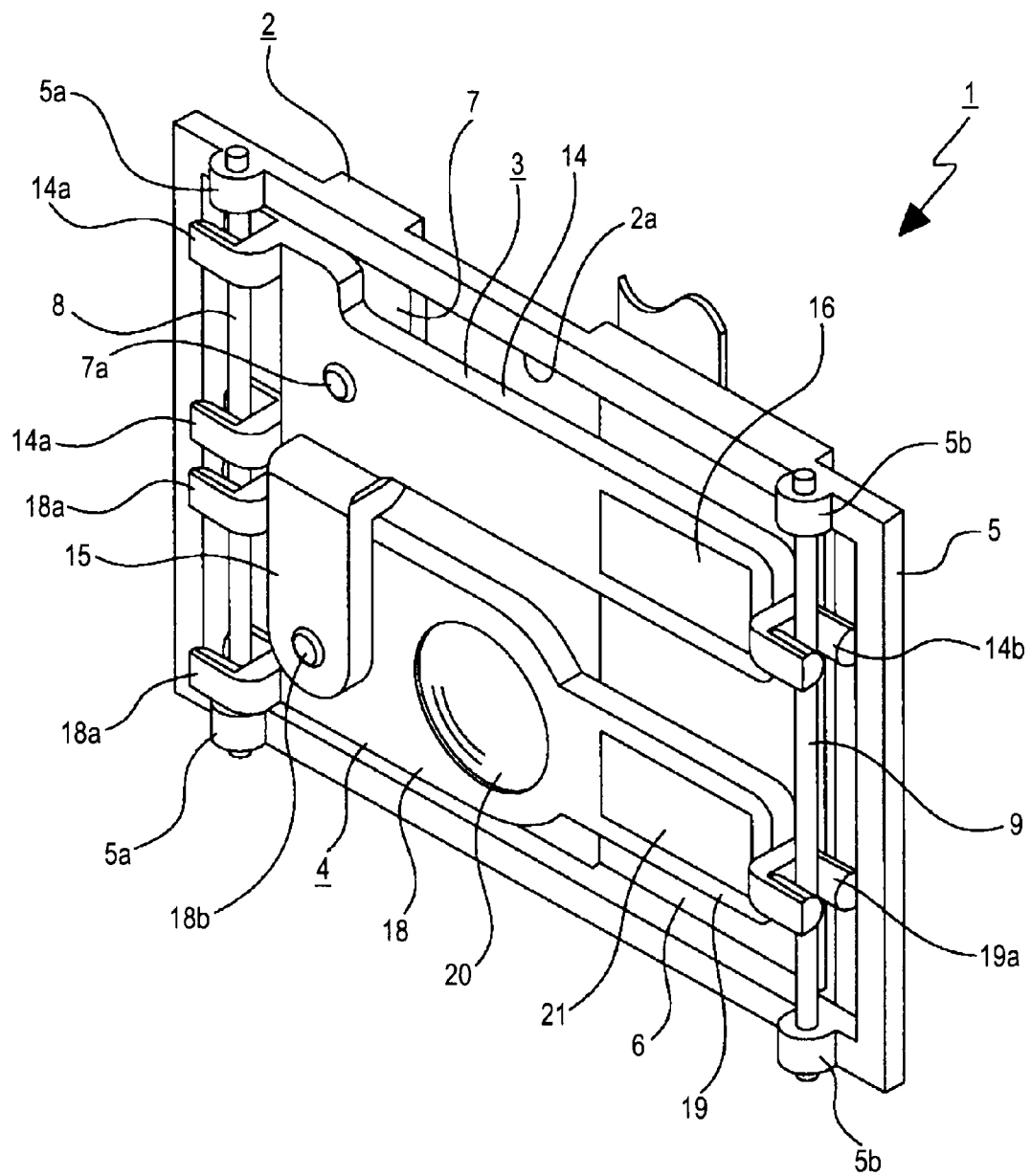
FIG. 2 is an enlarged perspective view.
Figure 3:
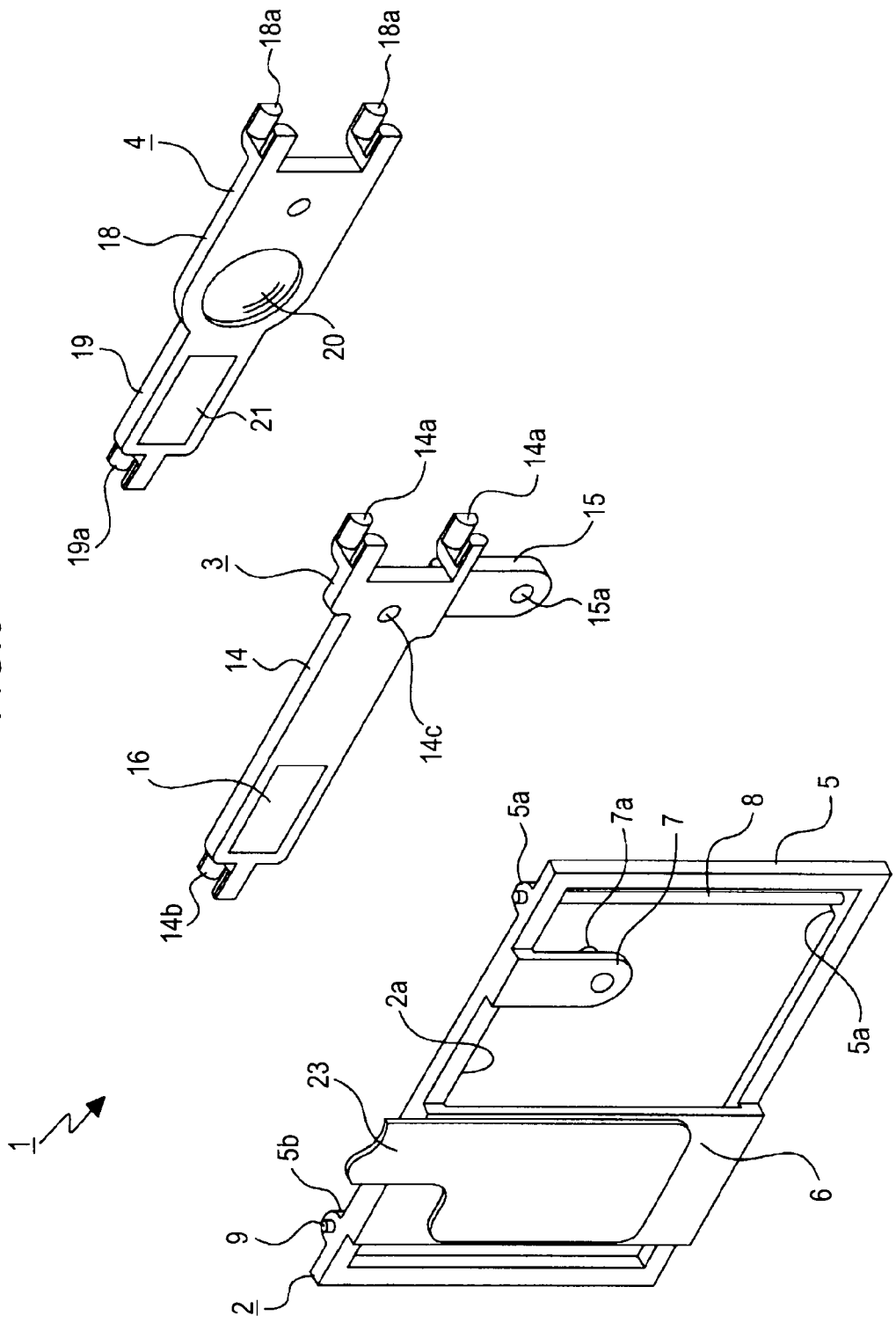
FIG. 3 is an exploded perspective view showing the image blur correction apparatus viewed in a direction different from that in FIG. 1.
Figure 4:
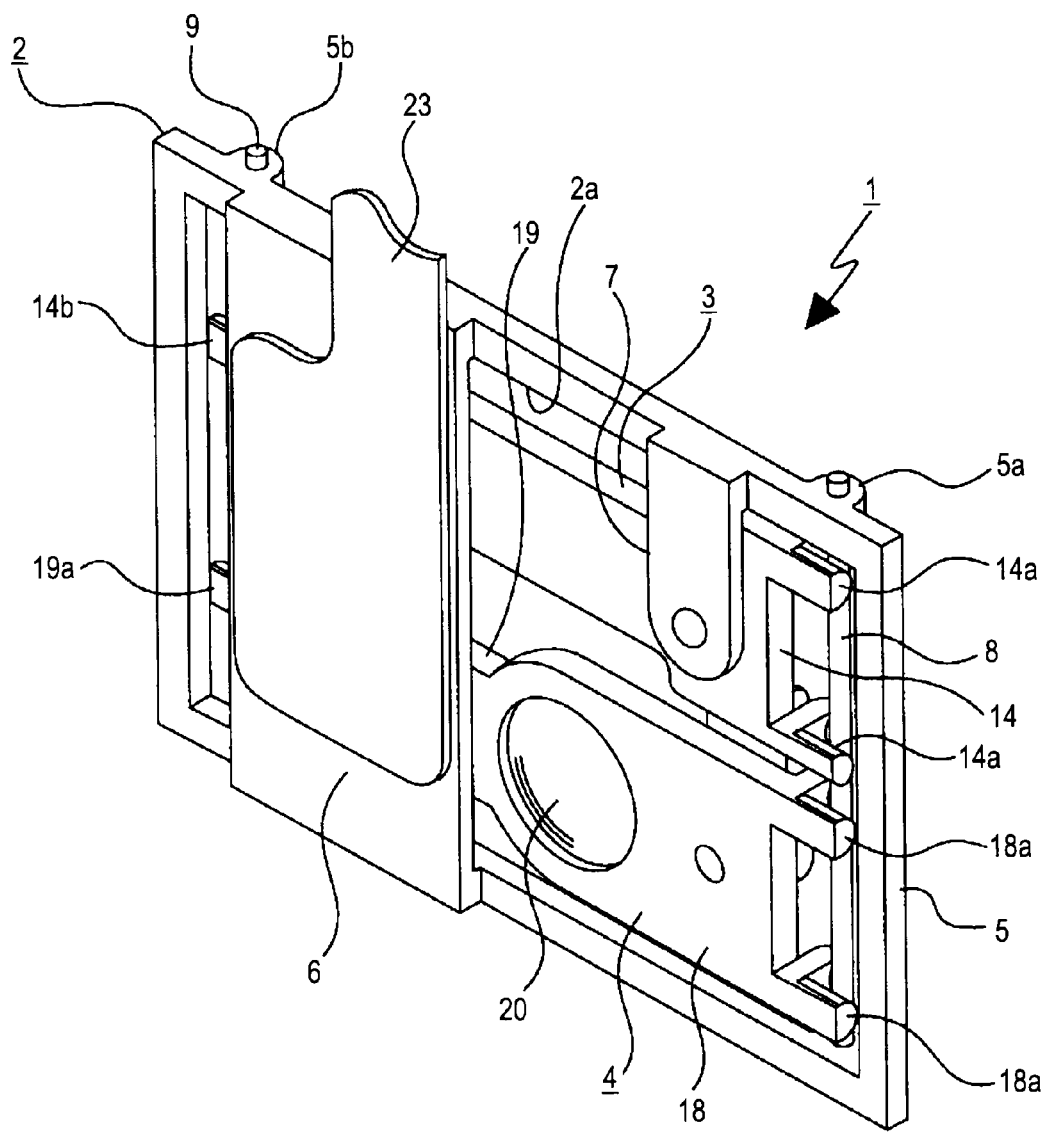
FIG. 4 is an enlarged perspective view showing the image blur correction apparatus viewed in a direction different from that in FIG. 2.
Figure 5:
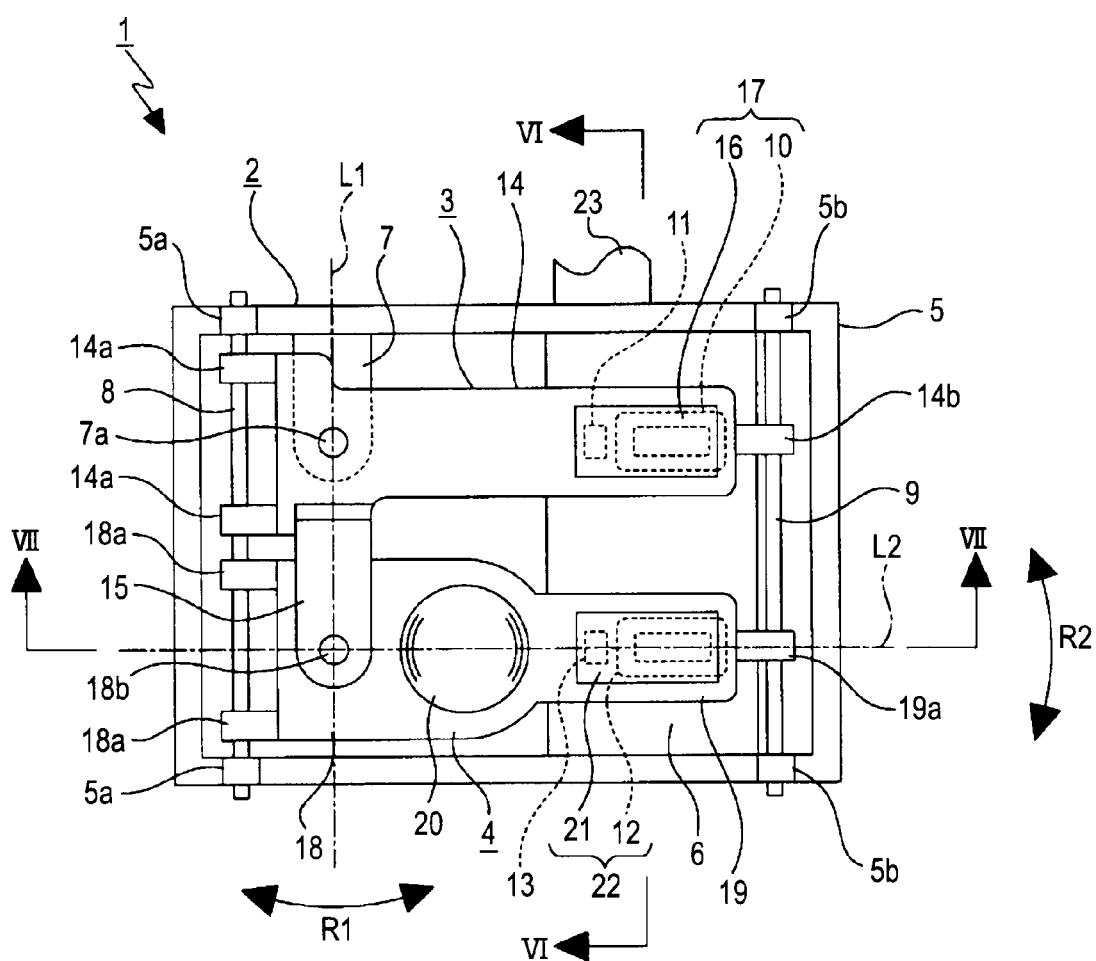
FIG. 5 is an enlarged front view.

The best mode for providing an image blur correction apparatus and an imaging apparatus according to the embodiments of the invention will be described below with reference to the accompanying drawings.

In the best mode described below, an imaging apparatus of the invention is applied to a video camcorder, and an image blur correction apparatus of the invention is applied to an image blur correction apparatus incorporated in the video camcorder.

The imaging apparatus and the image blur correction apparatus of the invention are not limited to the video camcorder and the image blur correction apparatus incorporated in the video camcorder, and is widely applicable, for example, to imaging apparatus incorporated in still cameras, mobile phones, personal digital assistants (PDAs), and a variety of other apparatus and image blur correction apparatus incorporated in the imaging apparatus described above.

In the following description, the forward, backward, upward, downward, rightward, and leftward directions are those viewed by an operator of the video camcorder when the operator captures images. In this case, a subject is present on the forward side, and the operator is present on the backward side.

The forward, backward, upward, downward, rightward, and leftward directions used in the following description are for convenience of description. The invention is not limited to the definition but can be implemented based on other direction definitions.

The lens described below may be formed of a single lens or a lens group including a plurality of lenses.

[Overall configuration of image blur correction apparatus]

An image blur correction apparatus will first be described.

<First Embodiment>

A first embodiment of an image blur correction apparatus will be described below (see FIGS. 1 to 9).

An image blur correction apparatus 1 includes a fixed member 2, a first driven unit 3, and a second driven unit 4 (see FIGS. 1 to 5).

The fixed member 2 is formed of a horizontally long, rectangular frame-shaped portion 5, a board attachment portion provided between upper and lower end portions of the frame-shaped portion 5, and a support protrusion 7 protruding downward from the upper end portion of the frame-shaped portion 5.

First shaft holding sections 5a, 5a set apart from each other in the upward-downward direction are provided on the frame-shaped portion 5 in positions close to the right end thereof, and second shaft holding sections 5b, 5b set apart from each other in the upward-downward direction are provided on the frame-shaped portion 5 in positions close to the left end thereof.

The board attachment portion 6 is disposed on the left end side of the frame-shaped portion 5, and the space between a right end portion of the frame-shaped portion 5 and the board attachment portion 6 forms an opening 2a. Placement holes 6a and 6b set apart from each other in the upward-downward direction are formed in the board attachment portion 6.

A first support shaft 7a protruding forward is provided on a lower end portion of the support protrusion 7.

A first guide shaft 8 is attached between the first shaft holding sections 5a, 5a of the frame-shaped portion 5, and a second guide shaft 9 is attached between the second shaft holding sections 5b, 5b of the frame-shaped portion 5.

A first drive coil 10 and a first detection device 11 are disposed side by side in the placement hole 6a formed in the board attachment portion 6. A second drive coil 12 and a second detection device 13 are disposed side by side in the placement hole 6b formed in the board attachment portion 6. Each of the first detection device 11 and the second detection device 13 is, for example, a magnetic detection device.

The first driven unit 3 is formed of a supported portion 14 extending in the rightward-leftward direction and a support portion 15 protruding downward from a right end portion of the supported portion 14.

First shaft receiving sections 14a, 14a, each of which opens rightward, has a U-like shape, and is set apart from the other in the upward-downward direction, are provided at a right end portion of the supported portion 14, and a second shaft receiving section 14b, which opens leftward and has a U-like shape, is provided at a left end portion of the supported portion 14. The supported portion 14 also has a supported hole 14c passing therethrough in the forward-backward direction in a position close to the right end thereof. A first drive magnet 16 is attached to a left end portion of the supported portion 14.

The support portion 15 is positioned forward relative to the supported portion 14. The support portion 15 has a support hole 15a formed therethrough in the forward-backward direction.

With the first support shaft 7a provided on the support protrusion 7 of the fixed member 2 being inserted forward into the supported hole 14c formed in the supported portion 14, the first driven unit 3 is pivotally supported by the fixed member 2 around the first support shaft 7a.

Figure 6:
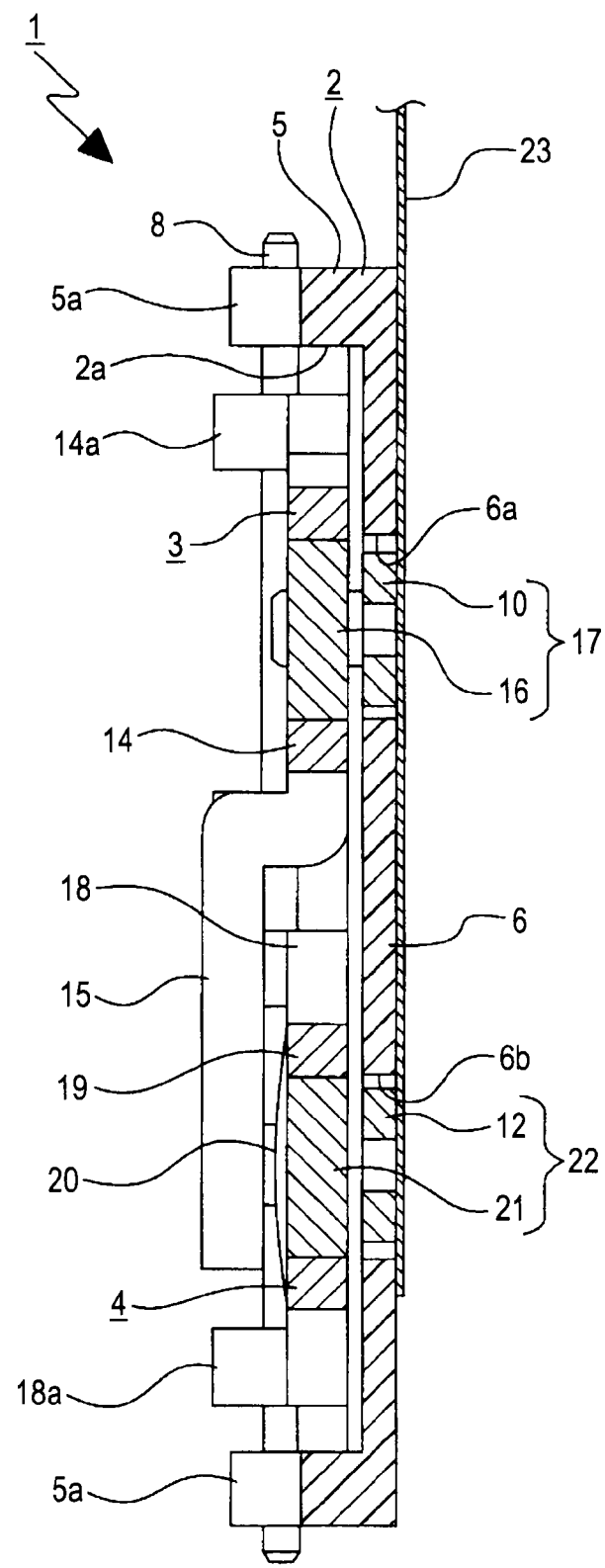
FIG. 6 is a cross-sectional view taken along the line VI-VI shown in FIG. 5.

With the first driven unit 3 being pivotally supported by the fixed member 2, the first shaft receiving sections 14a, 14a are slidably supported by the first guide shaft 8, the second shaft receiving section 14b is slidably supported by the second guide shaft 9, and the first drive magnet 16 is positioned in front of the first drive coil 10 and the first detection device 11 so as to face them (see FIG. 6).

The first drive magnet 16 and the first drive coil 10 form a first actuator 17 that pivots the first driven unit 3 and the second driven unit 4 around the first support shaft 7a.

The second driven unit 4 is shaped so that it extends in the rightward-leftward direction and is formed of a lens attachment portion 18 and a magnet attachment portion 19 protruding leftward from the lens attachment portion 18 (see FIGS. 1 to 5).

First shaft receiving sections 18a, 18a, each of which opens rightward, has a U-like shape, and is set apart from the other in the upward-downward direction, are provided at a right end portion of the lens attachment portion 18, and a second support shaft 18b protruding forward is provided on the lens attachment portion 18 in a position close to the right end thereof.

A lens 20 is attached to a left end portion of the lens attachment portion 18. Instead of the lens 20, a CCD (charge coupled device), a CMOS (complementary metal oxide semiconductor) device, or any other suitable imaging device may be attached to the lens attachment portion 18.

A second shaft receiving section 19a, which opens leftward and has a U-like shape, is provided at a left end portion of the magnet attachment portion 19. A second drive magnet 21 is attached to the magnet attachment portion 19.

With the second support shaft 18b provided on the lens attachment portion 18 being inserted forward into the support hole 15a formed in the support portion 15 of the first driven unit 3, the second driven unit 4 is pivotally supported by the first driven unit 3 around the second support shaft 18b.

Figure 7:
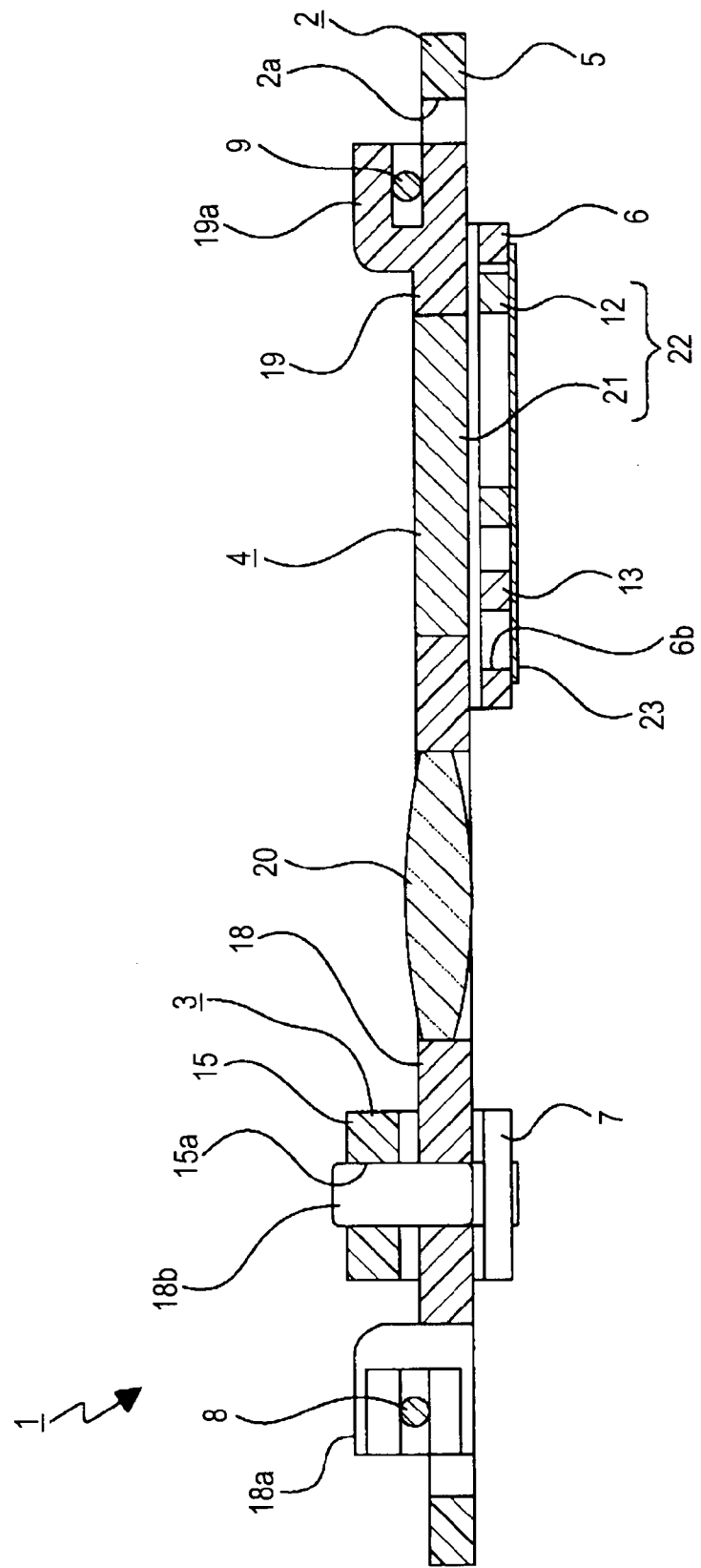
FIG. 7 is a cross-sectional view taken along the line VII-VII shown in FIG. 5.

With the second driven unit 4 being pivotally supported by the first driven unit 3, the first shaft receiving sections 18a, 18a are slidably supported by the first guide shaft 8, the second shaft receiving section 19a is slidably supported by the second guide shaft 9, and the second drive magnet 21 is positioned in front of the second drive coil 12 and the second detection device 13 so as to face them (see FIGS. 6 and 7). The support portion 15 of the first driven unit 3 is positioned in front of the lens attachment portion 18 of the second driven unit 4, and the lens 20 is located in the position corresponding to the opening 2a formed in the fixed member 2.

The second drive magnet 21 and the second drive coil 12 form a second actuator 22 that pivots the second driven unit 4 around the second support shaft 18b.

A flexible printed wiring board 23 is attached to the backside of the board attachment portion 6 of the fixed member 2. The first drive coil 10, the first detection device 11, the second drive coil 12, and the second detection device 13 are mounted on the front side of the flexible printed wiring board 23. Attaching the flexible printed wiring board 23 to the backside of the board attachment portion 6 of the fixed member 2 therefore allows the first drive coil 10 and the first detection device 11 to be disposed in the placement hole 6a formed in the board attachment portion 6 and the second drive coil 12 and the second detection device 13 to be disposed in the placement hole 6b formed in the board attachment portion 6.

The image blur correction apparatus 1 is configured as described above. Now, assuming that a line extending in the direction determined by connecting the center of the first support shaft 7a, around which the first driven unit 3 pivots, to the center of the second support shaft 18b, around which the second driven unit 4 pivots is determined as a first line L1, and a line extending in the direction determined by connecting the center of the second support shaft 18b to the center of the lens 20 is determined as a second line L2, the first line L1 extends in the upward-downward direction, and the second line L2 extends in the rightward-leftward direction (see FIG. 5).

The first line L1 and the second line L2 are perpendicular to each other and intersect each other at the center of the second support shaft 18b.

[Operation of image blur correction apparatus]

In the thus configured image blur correction apparatus 1, when a current is supplied to the first drive coil 10, the first actuator 17 produces an upward or downward thrust force in accordance with the relationship between the first drive magnet 16 and the direction of the supplied current, and the produced thrust force is applied to the first driven unit 3. When the upward or downward thrust force is applied to the first driven unit 3, the first driven unit 3 is pivoted relative to the fixed member 2 around the first support shaft 7a in a direction perpendicular to the optical axis direction, and the second driven unit 4 is moved substantially in the rightward-leftward direction (direction R1 shown in FIGS. 5, 8, and 9).

Further, when a current is supplied to the second drive coil 12, the second actuator 22 produces an upward or downward thrust force in accordance with the relationship between the second drive magnet 21 and the direction of the supplied current, and the produced thrust force is applied to the second driven unit 4. When the upward or downward thrust force is applied to the second driven unit 4, the second driven unit 4 is pivoted relative to the first driven unit 3 around the second support shaft 18b in a direction perpendicular to the optical axis direction, and the second driven unit 4 is moved substantially in the upward-downward direction (direction R2 shown in FIGS. 5, 8, and 9).

Figure 8:
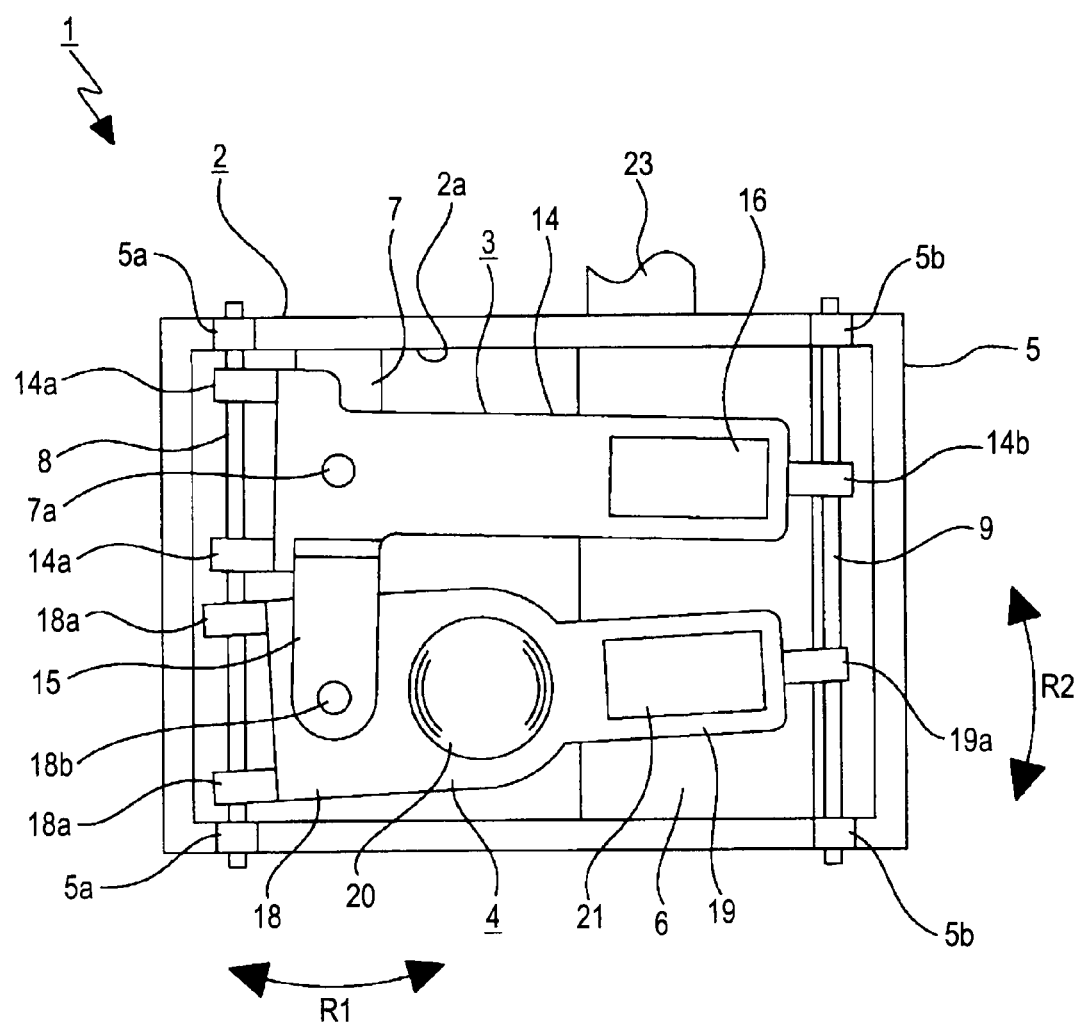
FIG. 8 is an enlarged front view showing a state in which first and second driven units are driven.
Figure 9:
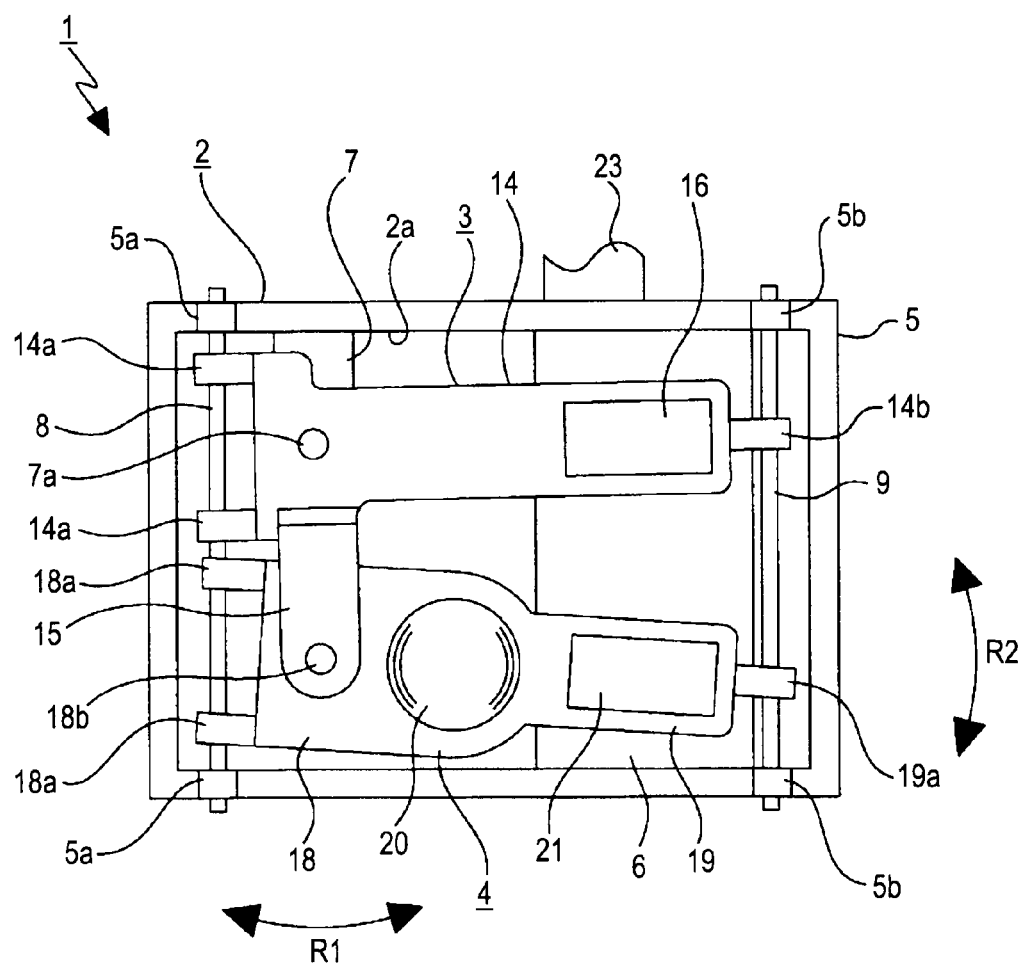
FIG. 9 is an enlarged front view showing a state in which the first and second driven units are driven in a direction different from that in FIG. 8.
Figure 10:
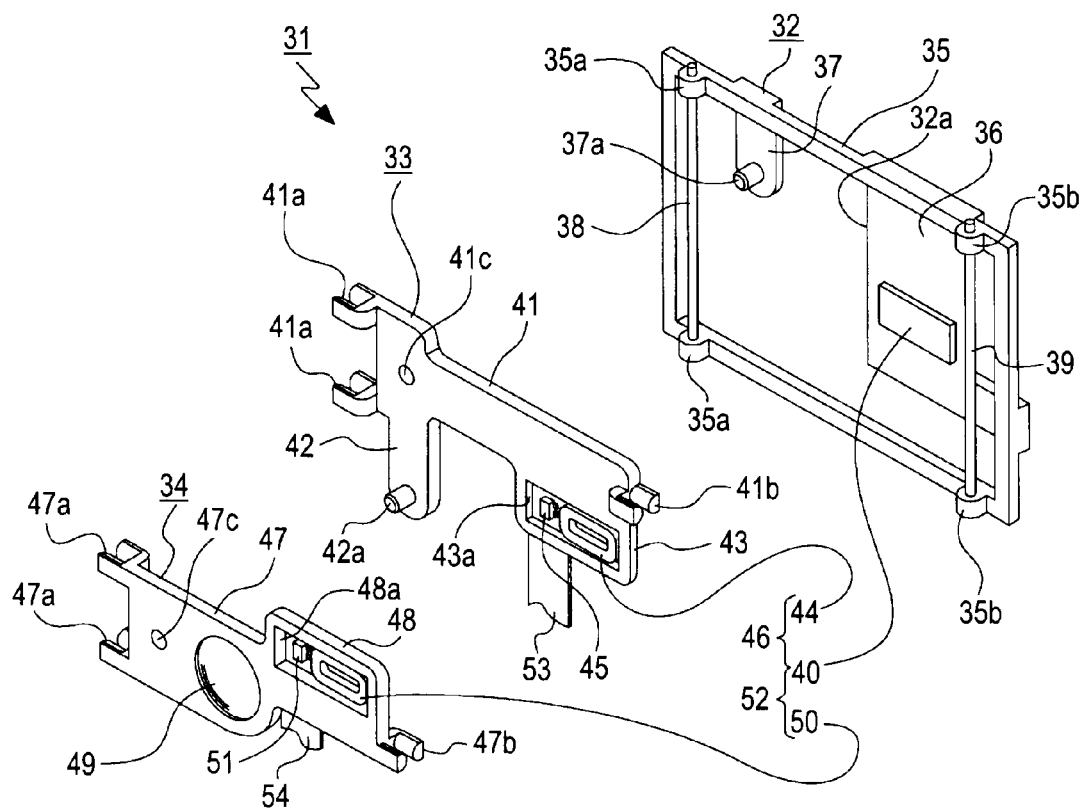
FIG. 10, along with FIGS. 11 to 18, shows an image blur correction apparatus according to a second embodiment of the invention and is an exploded perspective view.
Figure 11:
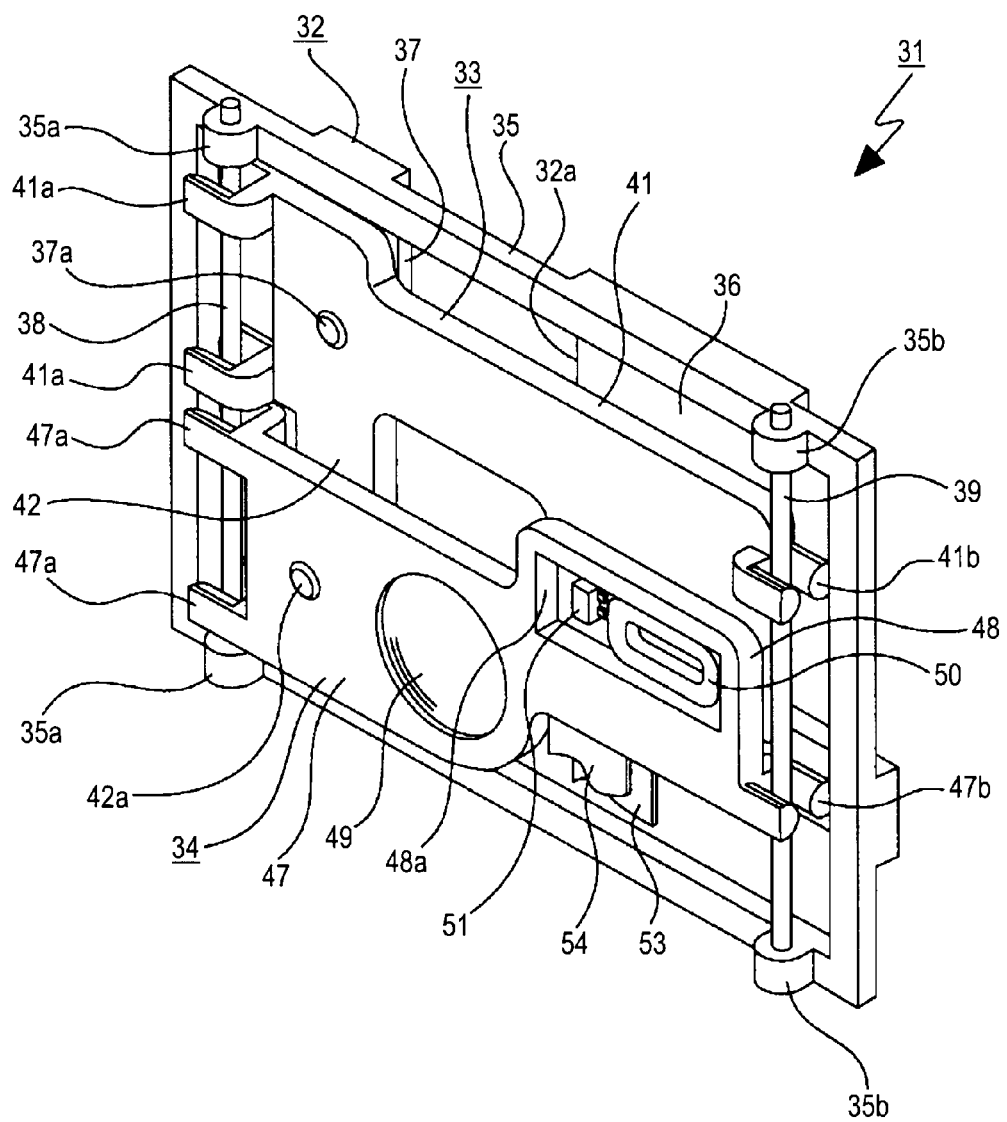
FIG. 11 is an enlarged perspective view.
Figure 12:
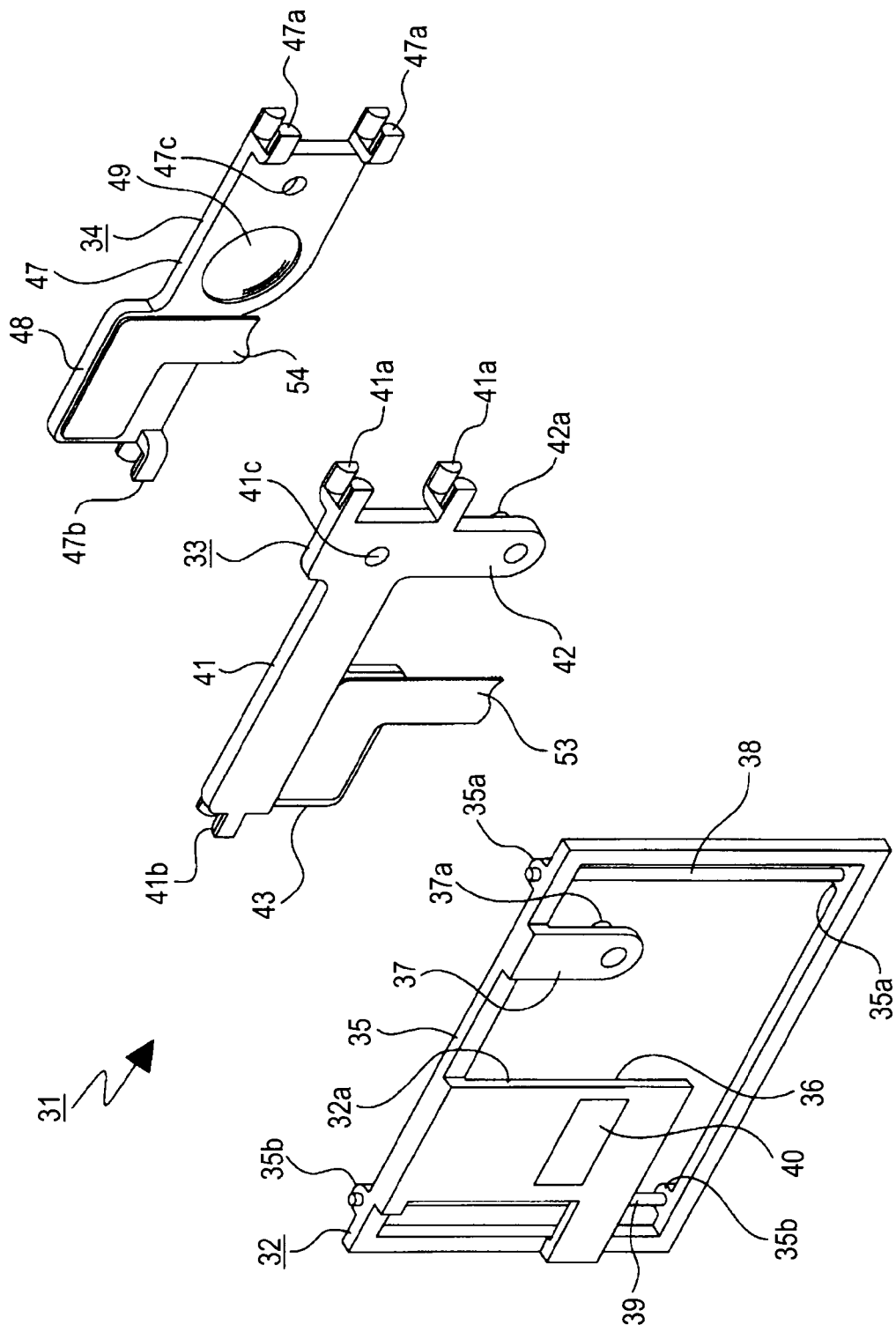
FIG. 12 is an exploded perspective view showing the image blur correction apparatus viewed in a direction different from that in FIG. 10.
Figure 13:
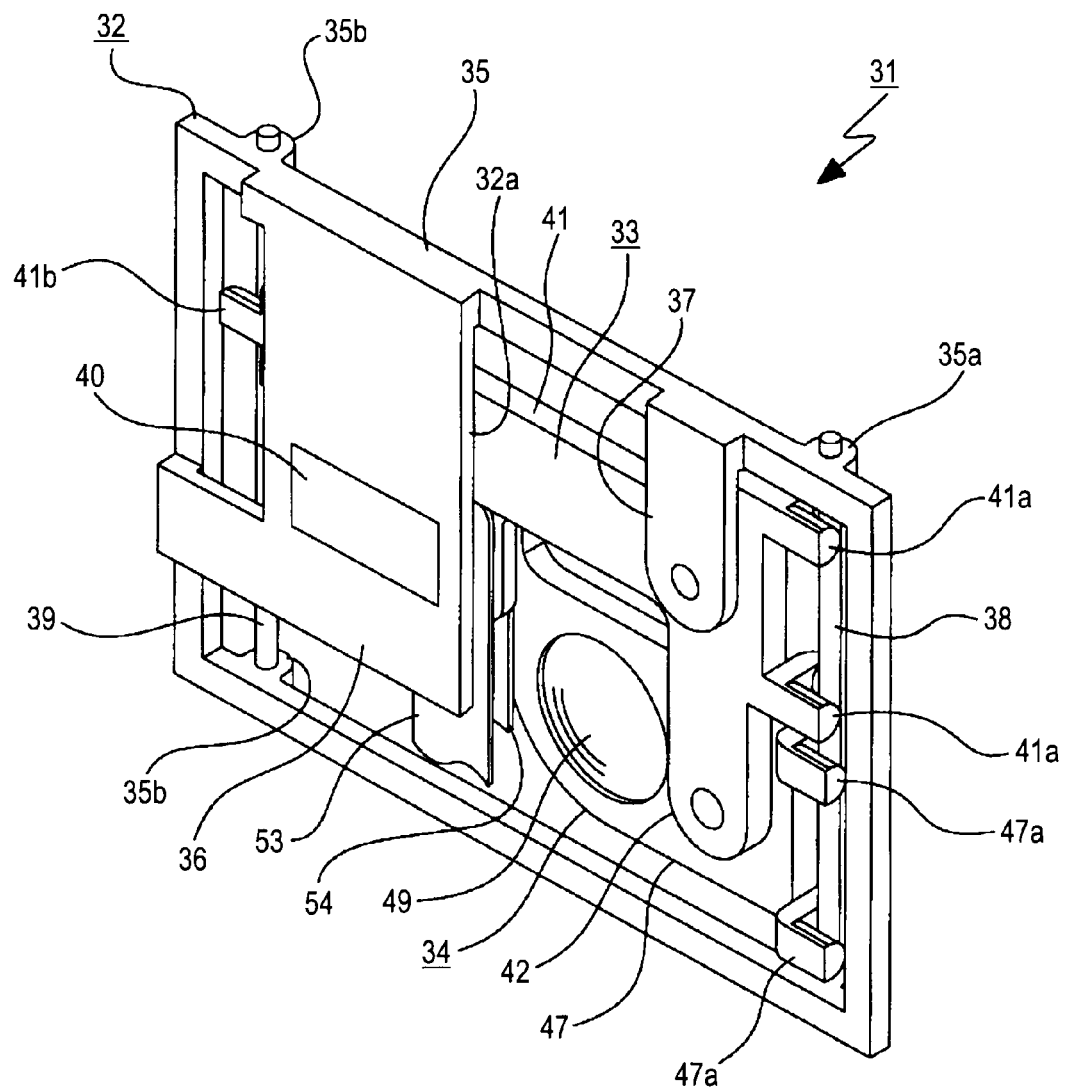
FIG. 13 is an enlarged perspective view showing the image blur correction apparatus viewed in a direction different from that in FIG. 11.
Figure 14:
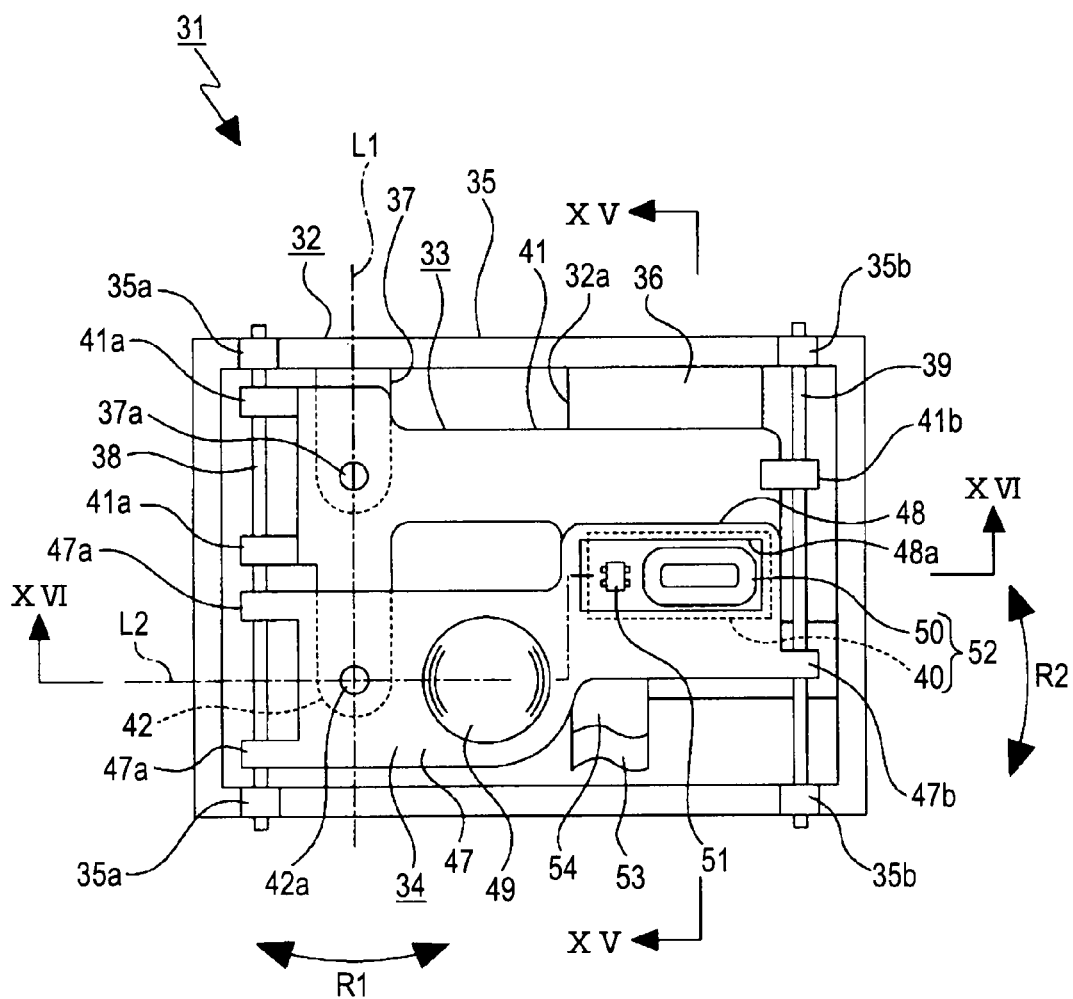
FIG. 14 is an enlarged front view.

For example, when the first actuator 17 applies a downward thrust force to the first driven unit 3, and the second actuator 22 applies an upward thrust force to the second driven unit 4, the lens 20 or the imaging device is moved upward but obliquely rightward as shown in FIG. 8. Alternatively, for example, when the first actuator 17 applies an upward thrust force to the first driven unit 3, and the second actuator 22 applies a downward thrust force to the second driven unit 4, the lens 20 or the imaging device is moved downward but obliquely leftward as shown in FIG. 9.

When the first driven unit 3 and the second driven unit 4 are pivoted, the first detection device 11 detects the position of the first driven unit 3 in the upward-downward direction, and the second detection device 13 detects the position of the second driven unit 4 in the upward-downward direction. The position to which the lens 20 or the imaging device has been moved in a plane perpendicular to the optical axis direction is calculated based on the detection results of the positions of the first driven unit 3 and the second driven unit 4 detected by the first detection device 11 and the second detection device 13, respectively.

As described above, a magnetic detection device is, for example, used as the first detection device 11 and the second detection device 13, and the positions of the first driven unit 3 and the second driven unit 4 are detected based on the change in magnetic flux produced by the first drive magnet 16 and the second drive magnet 21. The first drive magnet 16 and the second drive magnet 21 therefore not only function as components of the first actuator 17 and the second actuator 22 but also function as a first detection magnet for the first detection device 11 and a second detection magnet for the second detection device 13, respectively.

Since the first drive magnet 16 and the second drive magnet 21 function not only as the drive magnets for driving the first driven unit 3 and the second driven unit 4 but also as the detection magnets for detecting the positions of the first driven unit 3 and the second driven unit 4 as described above, the number of parts and hence the manufacturing cost can be reduced.

As described above, image blur is corrected by pivoting the second driven unit 4, which holds the lens 20 or the imaging device, in the R1 and R2 directions in a plane perpendicular to the optical axis direction.

In the image blur correction apparatus 1, the first line L1 extending in the direction determined by connecting the first support shaft 7a to the second support shaft 18b is perpendicular to the second line L2 extending in the direction determined by connecting the second support shaft 18b to the center of the lens 20 or the imaging device, as described above.

As a result, when the first driven unit 3 is pivoted around the first support shaft 7a substantially in the upward-downward direction, the second support shaft 18b will not be moved in the direction inclined by approximately 45 degrees substantially to the rightward-leftward direction, which is the direction in which the second driven unit 4 is driven, and hence correction made substantially in the upward-downward direction little affects correction made substantially in the rightward-leftward direction. That is, when the first driven unit 3 is pivoted substantially in the upward-downward direction, the second driven unit 4 is moved substantially in the rightward-leftward direction with a high linearity, and the movement of the second driven unit 4 in the upward-downward direction is little affected, whereby the performance in blur correction can be improved.

Further, since the first guide shaft 8 and the second guide shaft 9 support not only the first driven unit 3 but also the second driven unit 4, and the first driven unit 3 and the second driven unit 4 share the first guide shaft 8 and the second guide shaft 9, the number of parts can be reduced and the mechanism can be simplified.

The above description has been made with reference to the case where the first drive magnet 16 and the second drive magnet 21 are attached to the movable first driven unit 3 and second driven unit 4, respectively, and the first drive coil 10 and the second drive coil 12 are attached to the flexible wiring board 23 attached to the immobile fixed member 23.

Conversely, in the image blur correction apparatus described above, the actuators may be configured so that the drive coils are attached to the movable units and the drive magnets are attached to the fixed units.

<Second Embodiment>

A second embodiment of the image blur correction apparatus will be described below (see FIGS. 10 to 18).

An image blur correction apparatus 31 includes a fixed member 32, a first driven unit 33, and a second driven unit (see FIGS. 10 to 14).

The fixed member 32 is formed of a horizontally long, rectangular frame-shaped portion 35, a magnet attachment portion 36 provided between upper and lower end portions of the frame-shaped portion 35, and a support protrusion 37 protruding downward from the upper end portion of the frame-shaped portion 35.

First shaft holding sections 35a, 35a set apart from each other in the upward-downward direction are provided on the frame-shaped portion 35 in positions close to the right end thereof, and second shaft holding sections 35b, 35b set apart from each other in the upward-downward direction are provided on the frame-shaped portion 35 in positions close to the left end thereof.

The magnet attachment portion 36 is disposed on the left end side of the frame-shaped portion 35, and the space between a right end portion of the frame-shaped portion 35 and the magnet attachment portion 36 forms an opening 32a.

A first support shaft 37a protruding forward is provided on a lower end portion of the support protrusion 37.

A first guide shaft 38 is attached between the first shaft holding sections 35a, 35a of the frame-shaped portion 35, and a second guide shaft 39 is attached between the second shaft holding sections 35b, 35b of the frame-shaped portion 35.

A drive magnet 40 is attached to the magnet attachment portion 36.

The first driven unit 33 is formed of a supported portion 41 extending in the rightward-leftward direction, a support portion 42 protruding downward from a right end portion of the supported portion 41, and a coil attachment portion 43 protruding downward from a left end portion of the supported portion 41.

First shaft receiving sections 41a, 41a, each of which opens rightward, has a U-like shape, and is set apart from the other in the upward-downward direction, are provided at a right end portion of the supported portion 41, and a second shaft receiving section 41b, which opens leftward and has a U-like shape, is provided at a left end portion of the supported portion 41. The supported portion 41 also has a supported hole 41c passing therethrough in the forward-backward direction in a position close to the right end thereof.

A second support shaft 42a protruding forward is provided on the support portion 42.

A placement hole 43a is formed in the coil attachment portion 43. A first drive coil 44 and a first detection device 45 are disposed side by side in the placement hole 43a formed in the coil attachment portion 43. The first detection device 45 is, for example, a magnetic detection device.

With the first support shaft 37a provided on the support protrusion 37 of the fixed member 32 being inserted forward into the supported hole 41c formed in the supported portion 41, the first driven unit 33 is pivotally supported by the fixed member 32 around the first support shaft 37a.

Figure 15:
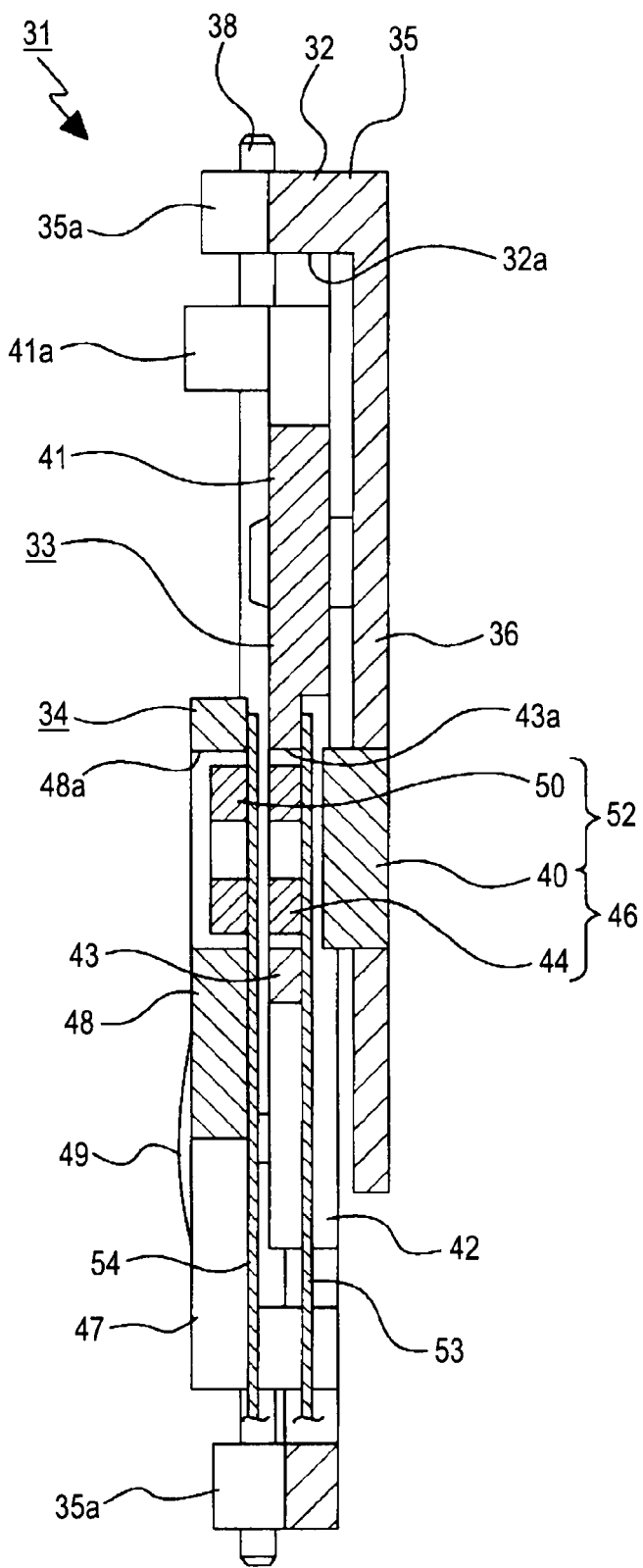
FIG. 15 is a cross-sectional view taken along the line XV-XV shown in FIG. 14.
Figure 16:
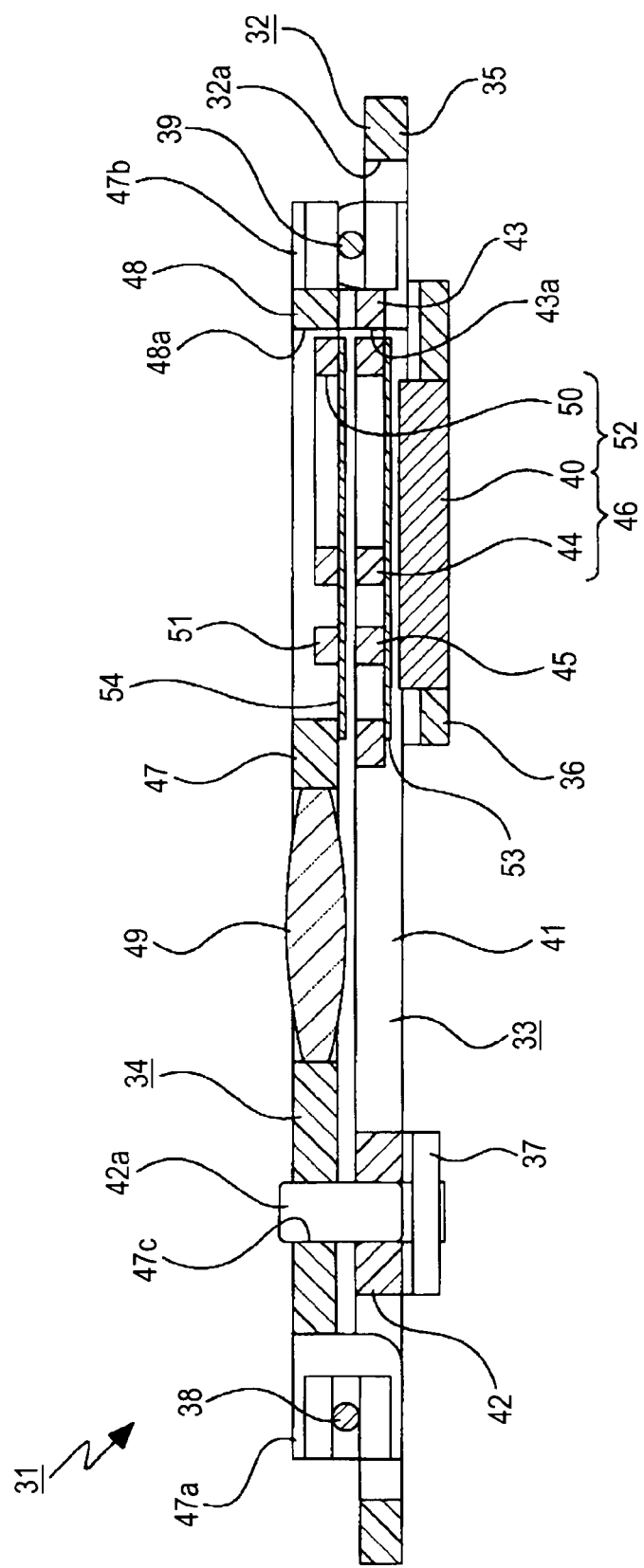
FIG. 16 is a cross-sectional view taken along the line XVI-XVI shown in FIG. 14.

With the first driven unit 33 being pivotally supported by the fixed member 32, the first shaft receiving sections 41a, 41a are slidably supported by the first guide shaft 38, the second shaft receiving section 41b is slidably supported by the second guide shaft 39, and the first drive coil 44 and the first detection device 45 are positioned in front of the drive magnet 40 so as to face it (see FIGS. 15 and 16).

The drive magnet 40 and the first drive coil 44 form a first actuator 46 that pivots the first driven unit 33 and the second driven unit 34 around the first support shaft 37a.

The second driven unit 34 is formed of a lens attachment portion 47 extending in the rightward-leftward direction and a coil attachment portion 48 protruding upward from a left end portion of the lens attachment portion 47 (see FIGS. 10 to 14).

First shaft receiving sections 47a, 47a, each of which opens rightward, has a U-like shape, and is set apart from the other in the rightward-leftward direction, are provided at a right end portion of the lens attachment portion 47. A second shaft receiving section 47b, which opens leftward and has a U-like shape, is provided at a left end portion of the lens attachment portion 47. The lens attachment portion 47 also has a supported hole 47c passing therethrough in the forward-backward direction in a position close to the right end thereof.

A lens 49 is attached to a central portion of the lens attachment portion 47. Instead of the lens 49, a CCD, a CMOS device, or any other suitable imaging device may be attached to the lens attachment portion 47.

A placement hole 48*a* is formed in the coil attachment portion 48. A second drive coil 50 and a second detection device 51 are disposed side by side in the placement hole 48*a* formed in the coil attachment portion 48. The second detection device 51 is, for example, a magnetic detection device.

With the second support shaft 42*a* provided on the support portion 42 of the first driven unit 33 being inserted forward into the supported hole 47*c* formed in the lens attachment portion 47, the second driven unit 34 is pivotally supported by the first driven unit 33 around the second support shaft 42*a*.

With the second driven unit 34 being pivotally supported by the first driven unit 33, the first shaft receiving sections 47*a*, 47*a* are slidably supported by the first guide shaft 38, and the second shaft receiving section 47*b* is slidably supported by the second guide shaft 39. The second drive coil 50 and the second detection device 51 are positioned in front of the drive magnet 40 to face it with the first drive coil 44 and the first detection device 45 sandwiched therebetween (see FIGS. 15 and 16).

The drive magnet 40 and the second drive coil 50 form a second actuator 52 that pivots the second driven unit 34 around the second support shaft 42*a*.

Flexible printed wiring boards 53 and 54 are attached to the backside of the first driven unit 33 and the backside of the second driven unit 34, respectively. The first drive coil 44 and the first detection device 45 are mounted on the front side of the flexible printed wiring board 53, and the second drive coil 50 and the second detection device 51 are mounted on the front side of the flexible printed wiring board 54. Attaching the flexible printed wiring board 53 to the backside of the first driven unit 33 therefore allows the first drive coil 44 and the first detection device 45 to be disposed in the placement hole 43*a* formed in the coil attachment portion 43. Similarly, attaching the flexible printed wiring board 54 to the backside of the second driven unit 34 allows the second drive coil 50 and the second detection device 51 to be disposed in the placement hole 48*a* formed in the coil attachment portion 48.

The image blur correction apparatus 31 is configured as described above. Now, assuming that a line extending in the direction determined by connecting the center of the first support shaft 37*a*, around which the first driven unit 33 pivots, to the center of the second support shaft 42*a*, around which the second driven unit 34 pivots is determined as a first line L1, and a line extending in the direction determined by connecting the center of the second support shaft 42*a* to the center of the lens 49 is determined as a second line L2, the first line L1 extends in the upward-downward direction, and the second line L2 extends in the rightward-leftward direction (see FIG. 14).

The first line L1 and the second line L2 are perpendicular to each other and intersect each other at the center of the second support shaft 42*a*.

[Operation of image blur correction apparatus]

In the thus configured image blur correction apparatus 31, when a current is supplied to the first drive coil 44, the first actuator 46 produces an upward or downward thrust force in accordance with the relationship between the drive magnet 40 and the direction of the supplied current, and the produced thrust force is applied to the first driven unit 33. When the upward or downward thrust force is applied to the first driven unit 33, the first driven unit 33 is pivoted relative to the fixed member 32 around the first support shaft 37*a* in a direction perpendicular to the optical axis direction, and the second driven unit 34 is moved substantially in the rightward-leftward direction (direction R1 shown in FIGS. 14, 17, and 18).

When a current is supplied to the second drive coil 50, the second actuator 52 produces an upward or downward thrust force in accordance with the relationship between the drive magnet 40 and the direction of the supplied current, and the produced thrust force is applied to the second driven unit 34. When the upward or downward thrust force is applied to the second driven unit 34, the second driven unit 34 is pivoted relative to the first driven unit 33 around the second support shaft 42*a* in a direction perpendicular to the optical axis direction, and the second driven unit 34 is moved substantially in the upward-downward direction (direction R2 shown in FIGS. 14, 17, and 18).

Figure 17:
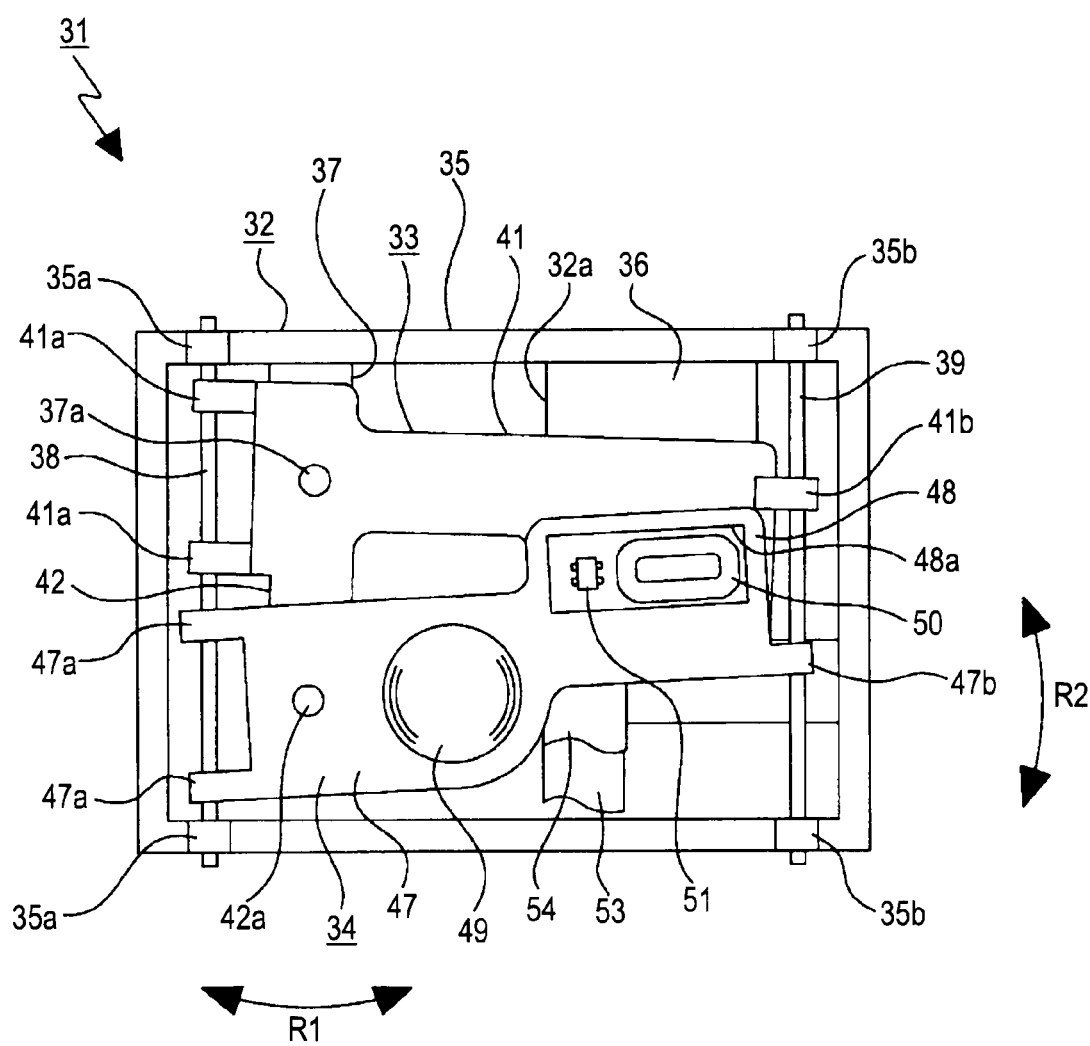
FIG. 17 is an enlarged front view showing a state in which first and second driven units are driven.
Figure 18:
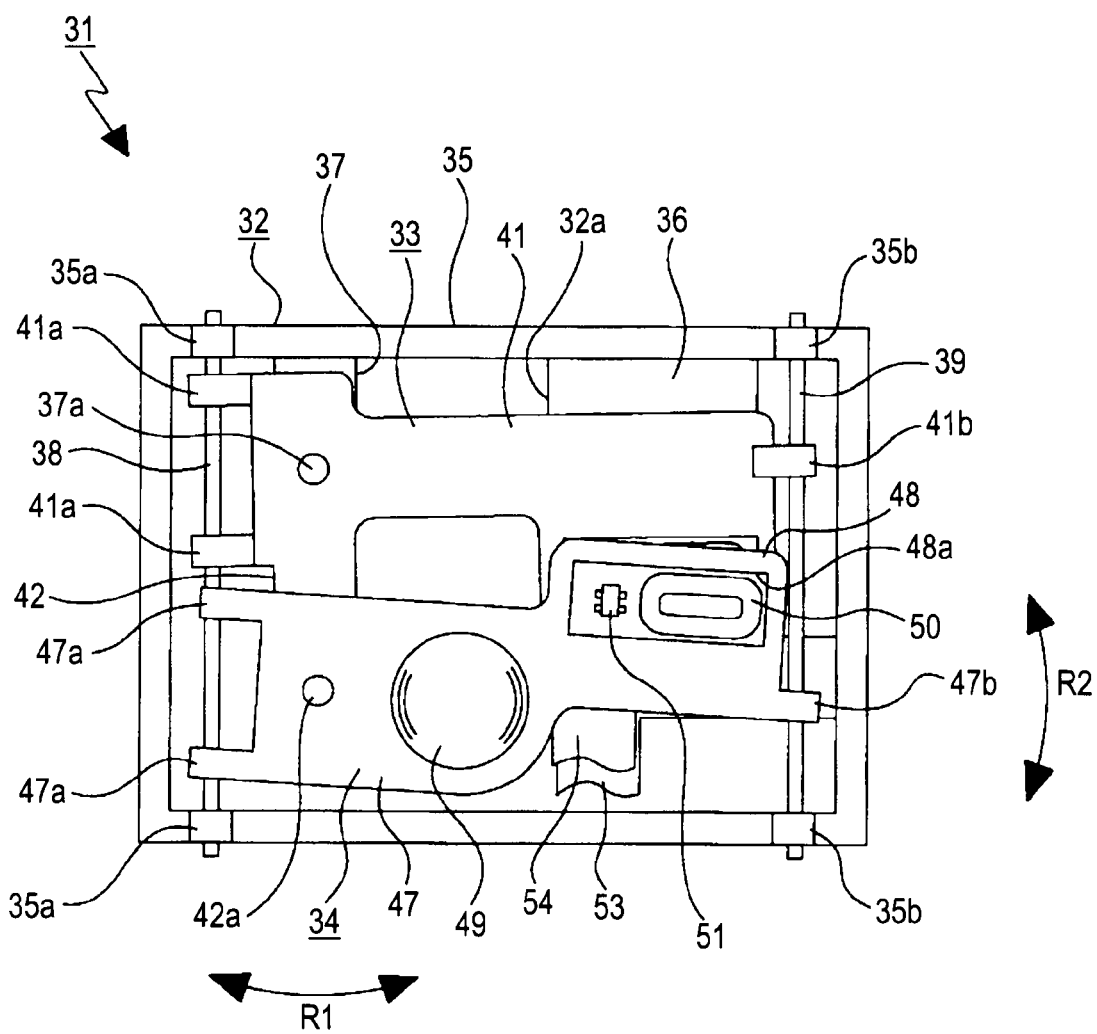
FIG. 18 is an enlarged front view showing a state in which the first and second driven units are driven in a direction different from that in FIG. 17.

For example, when the first actuator 46 applies a downward thrust force to the first driven unit 33, and the second actuator 52 applies an upward thrust force to the second driven unit 34, the lens 49 or the imaging device is moved upward but obliquely rightward as shown in FIG. 17. Alternatively, for example, when the first actuator 46 applies an upward thrust force to the first driven unit 33, and the second actuator 52 applies a downward thrust force to the second driven unit 34, the lens 49 or the imaging device is moved downward but obliquely leftward as shown in FIG. 18.

When the first driven unit 33 and the second driven unit 34 are pivoted, the first detection device 45 detects the position of the first driven unit 33 in the upward-downward direction, and the second detection device 51 detects the position of the second driven unit 34 in the upward-downward direction. The position to which the lens 49 or the imaging device has been moved in a plane perpendicular to the optical axis direction is calculated based on the detection results of the position of the first driven unit 33 and the second driven unit 34 detected by the first detection device 45 the second detection device 51, respectively.

As described above, a magnetic detection device is, for example, used as the first detection device 45 and the second detection device 51, and the positions of the first driven unit 33 and the second driven unit 34 are detected based on the change in magnetic flux produced by the drive magnet 40. The drive magnet 40 therefore not only functions as an component of the first actuator 46 and the second actuator 52 but also functions as a first detection magnet for the first detection device 45 and a second detection magnet for the second detection device 51.

Since the drive magnet 40 functions as a common drive magnet for driving the first driven unit 33 and the second driven unit 34 as described above, the number of parts and hence the manufacturing cost can be reduced.

Further, since the drive magnet 40 also functions as a common detection magnet for detecting the positions of the first driven unit 33 and the second driven unit 34 as described above, the number of parts and hence the manufacturing cost can be reduced.

Moreover, since the drive magnet 40 functions not only as a common drive magnet for driving the first driven unit 33 and the second driven unit 34 but also as a common detection magnet for detecting the positions of the first driven unit 33 and the second driven unit 34, the number of parts and hence the manufacturing cost can be further reduced.

As described above, image blur is corrected by pivoting the second driven unit 34, which holds the lens 49 or the imaging device, in the R1 and R2 directions in a plane perpendicular to the optical axis direction.

In the image blur correction apparatus 31, the first line L1 extending in the direction determined by connecting the first support shaft 37*a* to the second support shaft 42*a* is perpendicular to the second line L2 extending in the direction determined by connecting the second support shaft 42a to the center of the lens 49 or the imaging device, as described above.

As a result, when the first driven unit 33 is pivoted around the first support shaft 37a substantially in the upward-downward direction, the second support shaft 42a will not be moved in the direction inclined by approximately 45 degrees substantially to the rightward-leftward direction, which is the direction in which the second driven unit 34 is driven, and hence correction made in substantially the upward-downward direction little affects correction made in substantially the rightward-leftward direction. That is, when the first driven unit 33 is pivoted substantially in the upward-downward direction, the second driven unit 34 is moved substantially in the rightward-leftward direction with a high linearity, and the movement of the second driven unit 34 in the upward-downward direction is little affected, whereby the performance in blur correction can be improved.

Further, since the first guide shaft 38 and the second guide shaft 39 support not only the first driven unit 33 but also the second driven unit 34, the number of parts can be reduced and the mechanism can be simplified.

[Imaging apparatus]

Figure 19:
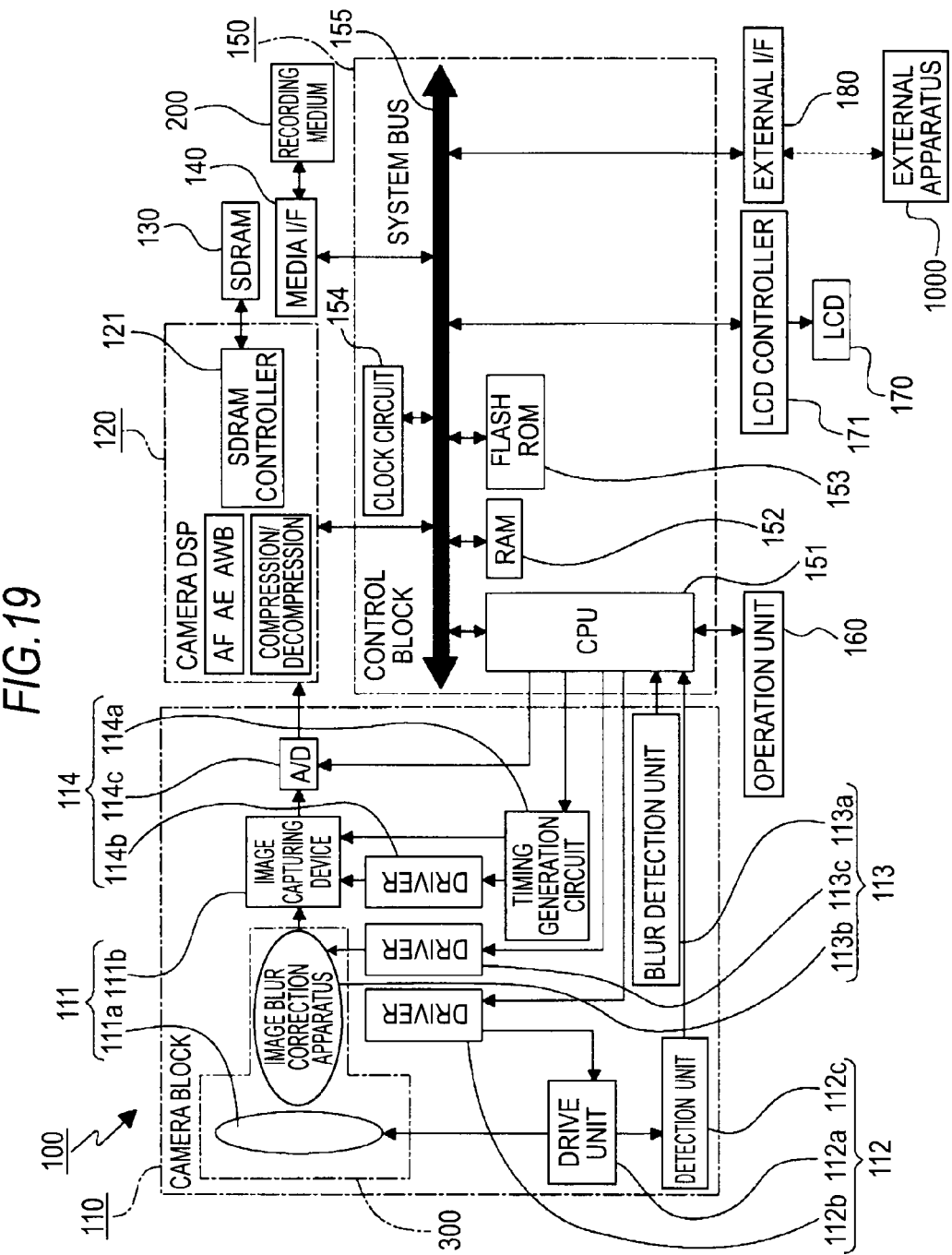
FIG. 19 is a block diagram of an imaging apparatus.

An example of an imaging apparatus will next be described (see FIG. 19).

An imaging apparatus 100 includes a camera block 110, a camera DSP (digital signal processor) 120, an SDRAM (synchronous dynamic random access memory) 130, a media interface 140, a control block 150, an operation unit 160, an LCD (liquid crystal display) 170, and an external interface 180. A recording medium 200 can be loaded and unloaded to and from the imaging apparatus 100.

The recording medium 200 can be what is called a memory card including a semiconductor memory, and a variety of disk-type recoding media including a recordable DVD (digital versatile disk), and a recordable CD (compact disc).

The camera block 110 includes an imaging unit 111, a lens drive system 112, a hand jiggling correction system 113, and an image retrieve system 114.

The imaging unit 111 includes an imaging lens 111a for producing an optical image and an imaging device 111b that converts the produced optical image into an electric signal. The imaging device 111b is, for example, a CCD or a CMOS device described above.

The lens drive system 112 has a function of driving a movable lens in the imaging lens 111a to perform zooming and focusing. The lens drive system 112 includes a drive unit 112a, such as a stepper motor, for driving the movable lens, a driver 112b that sends a drive signal to the drive unit 112a, and a detection unit 112c for feeding back the operation of the drive unit 112a.

The hand jiggling correction system 113 includes a blur detection unit 113a, such as a detection device that detects image blur that occurs in the imaging apparatus 100, and a driver 113c that drives an image blur correction apparatus 113b based on the detection result provided from the blur detection unit 113a. The image blue correction apparatus 113b corresponds to either of the image blue correction apparatus 1 and 31 described above.

The image blue correction apparatus 113b may be disposed in a housing along with the imaging lens 111a. The image blue correction apparatus 113b and the imaging lens 111a disposed in the housing form a lens barrel 300. The lens barrel 300 may be what is called an exchangeable lens attachable and detachable to and from the body of the imaging apparatus 100 or may be integrated with the body.

The image retrieve system 114 includes a timing generation circuit 114a that produces a drive timing at which the imaging device 111b is driven under the control of the control block 150, a driver 114b that drives the imaging device 111b based on the timing generated by the timing generation circuit 114a, and an A/D conversion circuit 114c that converts an analog signal extracted from the imaging device 111b into a digital signal.

The A/D conversion circuit 114c performs CDS (correlated double sampling) on image information in the form of an inputted electric signal to ensure a satisfactory S/N ratio, performs AGC (automatic gain control) to control the gain, and performs A/D (analog/digital) conversion to produce image data in the form of a digital signal.

The camera DSP 120 performs AF (auto focus), AE (auto exposure), AWB (auto white balance), and other signal processings on the image data inputted from the A/D conversion circuit 114c. The image data having undergone AF, AE, AWB, and other signal processings are compressed by using a predetermined method and outputted to and recorded on the recording medium 200 under the control of the control block 150.

The camera DSP 120 includes an SDRAM controller 121, which instructs the SDRAM 130 to read and write data at a high speed.

The control block 150 is a microcomputer formed of a CPU (central processing unit) 151, a RAM (random access memory) 152, a flash ROM (read only memory) 153, a clock circuit 154, and other components connected to each other via a system bus 155 and has a function of controlling the components in the imaging apparatus 100.

The CPU 151 sends instruction signals to the drivers 112b and 113c, the driver 114b via the timing generation circuit 114a, and other components to operate them.

The RAM 152 is primarily used as a working area for temporarily storing in-process results.

The flash ROM 153 stores a variety of programs executed in the CPU 151, data necessary for a variety of processes, and other information.

The clock circuit 154 outputs the current year, month, and date, the current day of the week, the current time, the date and time at which an image is captured, and other information.

The operation unit 160 is a touch panel, control keys, or other components provided on an exterior housing of the imaging apparatus 100. When the operation unit 160 is operated, a signal according to the operation is inputted to the CPU 151, which then sends an instruction signal to a relevant component based on the input signal.

The LCD 170 is controlled by an LCD controller 171 connected to the system bus 155. The LCD 170 displays image data and other various pieces of information based on a drive signal from the LCD controller 171.

The external interface 180 is connected to the system bus 155. The external interface 180 is a connecter that connects an external apparatus 1000, such as a personal computer, to the imaging apparatus 100. Connecting the external apparatus 1000 to the imaging apparatus 100 via the external interface 180 allows the imaging apparatus 100 not only to receive image data from the external apparatus 1000 and record the image data on the recording medium 200 but also to output image data recorded on the recording medium 200 to the external apparatus 1000. The recording medium 200 is connected to the control block 150 via the media interface 140 connected to the system bus 155.

Further, connecting the external apparatus 1000, such as a communication module, to the imaging apparatus 100 via the external interface 180 allows, for example, connection to a network, such as the Internet, and acquisition of a variety of image data and other information, recording of the acquired data and other information on the recording medium 200, and transmission of data recorded on the recording medium 200 to a destination apparatus over the network.

The external interface 180 can be a wired interface based, for example, on IEEE (Institute of Electrical and Electronics Engineers) 1394 or USB (universal serial bus) or an optical or radio wireless interface.

Image data recorded on the recording medium 200 is read therefrom based on an operation signal according to user's operation performed through the operation unit 160, and the read image data is sent to the camera DSP 120 via the media interface 140.

The camera DSP 120 decompresses (expands) the compressed image data which has been read and inputted from the recording medium 200 and sends the decompressed image data to the LCD controller 171 via the system bus 155. The LCD controller 171 sends an image signal based on the inputted image data to the LCD 170, which then displays an image based on the image signal.

SUMMARY

As described above, in either of the image blur correction apparatus 1 and 31 and the imaging apparatus 100 including the image blur correction apparatus, the first actuator 17 or 46, which pivots the first driven unit 3 or 33 and the second driven unit 4 or 34, and the second actuator 22 or 52 are configured to produce thrust forces in the same direction.

The first actuator 17 or 46 and the second actuator 22 or 52 can therefore be disposed in the same direction, whereby the mechanism can be simplified, and the space for disposing the first actuator 17 or 46 and the second actuator 22 or 52 and hence the size of the apparatus can be reduced.

The specific shapes and structures of the components shown in the best mode for carrying out the invention described above are only examples for embodying the invention. The technical extent of the invention should not be construed in a limited sense by these specific shapes and structures.

The present application contains subject matter related to that disclosed in Japanese Priority Patent Application JP 2010-143693 filed in the Japan Patent Office on Jun. 24, 2010, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image blur correction apparatus comprising:
a fixed member;
a first driven unit pivotally supported by the fixed member around a first support shaft extending in a direction parallel to an optical axis direction;
a second driven unit holding a lens or an imaging device and pivotally supported by the first driven unit around a second support shaft extending in the direction parallel to the optical axis direction;
a first actuator that produces a thrust force for pivoting the first and second driven units around the first support shaft; and
a second actuator that produces a thrust force for pivoting the second driven unit around the second support shaft,
wherein the first and second actuators are configured to produce the thrust forces in the same direction.

2. The image blur correction apparatus according to claim 1,
wherein when a first line is defined as a line extending in a direction determined by connecting the center of the first support shaft to the center of the second support shaft, and a second line is defined as a line extending in a direction determined by connecting the center of the second support shaft to the center of the lens or the imaging device,
the first line and the second line are perpendicular to each other.

3. The image blur correction apparatus according to claim 1,
wherein the first actuator is formed of a first drive magnet and a first drive coil that faces the first drive magnet,
the second actuator is formed of a second drive magnet and a second drive coil that faces the second drive magnet, and
the first and second drive magnets are formed of a common drive magnet.

4. The image blur correction apparatus according to claim 3, further comprising:
a first detection device that detects the position of the first driven unit in the direction of the pivotal motion thereof;
a second detection device that detects the position of the second driven unit in the direction of the pivotal motion thereof;
a first detection magnet that allows the first detection device to perform the detection; and
a second detection magnet that allows the second detection device to perform the detection,
wherein the first and second detection magnets are formed of a common detection magnet, and
the drive magnets and the detection magnets are formed of a common magnet.

5. The image blur correction apparatus according to claim 1, further comprising:
a first detection device that detects the position of the first driven unit in the direction of the pivotal motion thereof;
a second detection device that detects the position of the second driven unit in the direction of the pivotal motion thereof;
a first detection magnet that allows the first detection device to perform the detection; and
a second detection magnet that allows the second detection device to perform the detection,
wherein the first and second detection magnets are formed of a common detection magnet.

6. The image blur correction apparatus according to claim 1, further comprising:
first and second guide shafts disposed in a plane perpendicular to the optical axis direction,
wherein the first driven unit is supported by the first and second guide shafts, and
the second driven unit is supported by the first and second guide shafts.

7. An imaging apparatus comprising:
an image blur correction apparatus that corrects image blur by moving a lens or an imaging device in a direction perpendicular to an optical axis direction,
the image blur correction apparatus including
a fixed member,
a first driven unit pivotally supported by the fixed member around a first support shaft extending in a direction parallel to the optical axis direction, a second driven unit holding the lens or the imaging device and pivotally supported by the first driven unit around a second support shaft extending in the direction parallel to the optical axis direction, a first actuator that produces a thrust force for pivoting the first and second driven units around the first support shaft, and a second actuator that produces a thrust force for pivoting the second driven unit around the second support shaft, wherein the first and second actuators are configured to produce the thrust forces in the same direction.

* * * * *